US010808965B2

(12) United States Patent
Zhu

(10) Patent No.: US 10,808,965 B2
(45) Date of Patent: Oct. 20, 2020

(54) SECONDARY REFLECTORS FOR SOLAR COLLECTORS AND METHODS OF MAKING THE SAME

(71) Applicant: Alliance for Sustainable Energy, LLC, Golden, CO (US)

(72) Inventor: Guangdong Zhu, Englewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 441 days.

(21) Appl. No.: 15/631,522

(22) Filed: Jun. 23, 2017

(65) Prior Publication Data
US 2017/0370618 A1 Dec. 28, 2017

Related U.S. Application Data

(60) Provisional application No. 62/370,086, filed on Aug. 2, 2016, provisional application No. 62/354,948, filed
(Continued)

(51) Int. Cl.
*F24S 23/74* (2018.01)
*G02B 5/08* (2006.01)
(Continued)

(52) U.S. Cl.
CPC .............. *F24S 23/74* (2018.05); *F24S 23/79* (2018.05); *F24S 23/82* (2018.05); *F24S 25/00* (2018.05);
(Continued)

(58) Field of Classification Search
CPC .. F24S 23/74; F24S 23/79; F24S 23/82; F24S 23/71; F24S 23/72; F24S 2023/838;
(Continued)

(56) References Cited
U.S. PATENT DOCUMENTS 3,957,031 A * 5/1976 Winston .................... F21V 7/00
126/695
4,244,374 A * 1/1981 Man-El ................... F24S 23/74
126/651
(Continued)

FOREIGN PATENT DOCUMENTS

JP    2014052153 A  *  3/2014
JP    2015010748 A  *  1/2015
(Continued)

OTHER PUBLICATIONS

Desai et al., "Line-focusing Concentrating Solar Collector-based Power Plants: A Review", Clean Technologies Environmental Policy, 2017, vol. 19, pp. 9-35.
(Continued)

*Primary Examiner* — Steven B McAllister
*Assistant Examiner* — Daniel E. Namay
(74) *Attorney, Agent, or Firm* — Michael A. McIntyre

(57) ABSTRACT

The present disclosure relates to a device that includes a reflecting surface having a length aligned along a first axis (z), where a cross-section of the reflecting surface in a plane perpendicular to the first axis (z) forms a curve comprising a concave section positioned between a first endpoint and a second endpoint, at least a portion of the concave section is accurately approximated by a polynomial equation, an aperture is formed by a straight line connecting the first endpoint to the second endpoint, and the concave section is configured to focus a plurality of beams of light passing through the aperture onto a focal point.

13 Claims, 32 Drawing Sheets

Related U.S. Application Data on Jun. 27, 2016, provisional application No. 62/354,595, filed on Jun. 24, 2016.

(51) Int. Cl.
| | |
|---|---|
| *F24S 23/70* | (2018.01) |
| *F24S 25/00* | (2018.01) |
| *F24S 23/79* | (2018.01) |
| *G02B 19/00* | (2006.01) |
| *F24S 23/71* | (2018.01) |
| *F24S 23/72* | (2018.01) |

(52) U.S. Cl.
CPC ......... *G02B 5/085* (2013.01); *G02B 19/0023* (2013.01); *F24S 23/71* (2018.05); *F24S 23/72* (2018.05); *F24S 2023/83* (2018.05); *F24S 2023/832* (2018.05); *F24S 2023/834* (2018.05); *F24S 2023/838* (2018.05); *F24S 2023/872* (2018.05); *G02B 19/0042* (2013.01); *Y02E 10/40* (2013.01); *Y02E 10/45* (2013.01)

(58) Field of Classification Search
CPC ........... F24S 2023/834; F24S 2023/832; F24S 2023/83; Y02E 10/45
See application file for complete search history.

(56) References Cited

U.S. PATENT DOCUMENTS

| | | | | |
|---|---|---|---|---|
| 5,790,305 | A * | 8/1998 | Marcellin-Dibon | G02B 5/10 359/364 |
| 9,234,681 | B2 | 1/2016 | Tuli | |
| 2004/0057138 | A1* | 3/2004 | Tanijiri | G02B 5/10 359/868 |
| 2006/0018045 | A1* | 1/2006 | Moeller | G02B 5/10 359/838 |
| 2008/0049291 | A1* | 2/2008 | Baek | G02B 5/10 359/223.1 |
| 2010/0232176 | A1 | 9/2010 | Alasaarela et al. | |
| 2011/0041894 | A1* | 2/2011 | Liao | H01L 31/052 136/246 |
| 2011/0073149 | A1 | 3/2011 | Ladner | |
| 2012/0073567 | A1* | 3/2012 | Winston | B21D 53/02 126/652 |
| 2012/0118351 | A1* | 5/2012 | Moran | H01L 31/0547 136/246 |
| 2012/0275040 | A1* | 11/2012 | Li | G02B 5/10 359/846 |
| 2013/0100524 | A1* | 4/2013 | Magarill | G02B 17/08 359/365 |
| 2013/0128370 | A1* | 5/2013 | Negrisolo | G02B 5/10 359/853 |
| 2013/0192585 | A1* | 8/2013 | von Behrens | F24S 80/50 126/601 |
| 2013/0233299 | A1* | 9/2013 | Perryman | F24S 40/85 126/605 |
| 2014/0001766 | A1* | 1/2014 | Sayer | F03G 6/04 290/1 R |
| 2017/0012155 | A1* | 1/2017 | Holman | H01L 31/0549 |
| 2017/0285312 | A1* | 10/2017 | Zhu | G02B 17/0642 |
| 2018/0136039 | A1* | 5/2018 | Rolland | G01J 3/0208 |
| 2018/0316306 | A1* | 11/2018 | Magklaras | H02S 30/00 |

FOREIGN PATENT DOCUMENTS

| | | | |
|---|---|---|---|
| JP | 2015094533 A * | 5/2015 | |
| WO | WO-2016087969 A1 * | 6/2016 | ......... G02B 19/0019 |

OTHER PUBLICATIONS

Grena et al., "Solar Linear Fresnel Collector Using Molten Nitrates as Heat Transfer Fluid", Energy, Feb. 2011, vol. 36, No. 2, pp. 1048-1056.
Pye et al., "Transient Modelling of Cavity Receiver Heat Transfer for the Compact Linear Fresnel Reflector",, Destination Renewables, ANZSES, Manufacturing Engineering, 2003, pp. 69-78.
Reynolds et al., "An Experimental and Computational Study of the Heat Loss Characteristics of a Trapezoidal Cavity Absorber", Solar Energy, 2004, vol. 76, pp. 229-234.
Singh et al., "Technical Note: Performance Study of a Linear Fresnel Concentrating Solar Device", Renewable Energy, 1999, vol. 18, pp. 409-416.
Singh et al., "Thermal Performance of Linear Fresnel Reflecting Solar Concentrator with Trapezoidal Cavity Absorbers", Applied Energy, Feb. 2010, vol. 87, No. 2, pp. 541-550.
Zhu, "New Adaptive Method to Optimize the Secondary Reflector of Linear Fresnel Collectors", Solar Energy, 2017, vol. 144, pp. 117-126.

* cited by examiner

40b)

40c)

40d)

SECONDARY REFLECTORS FOR SOLAR COLLECTORS AND METHODS OF MAKING THE SAME

CROSS-REFERENCE TO RELATED APPLICATIONS

This application claims the benefit of U.S. Provisional Application Nos. 62/354,595, 62/354,948, and 62/370,086 filed Jun. 24, 2016, Jun. 27, 2016, and Aug. 2, 2016 respectively, the contents of which are incorporated herein by reference in their entirety.

CONTRACTUAL ORIGIN

The United States Government has rights in this disclosure under Contract No. DE-AC36-08GO28308 between the United States Department of Energy and the Alliance for Sustainable Energy, LLC, the Manager and Operator of the National Renewable Energy Laboratory.

BACKGROUND

There are two main approaches for collecting solar energy, photovoltaic (PV) and concentrating solar power (CSP). Unlike PV that directly converts solar irradiation into electricity, CSP utilizes reflectors to concentrate light (e.g. sunlight) onto absorber tube(s) at the reflector focal point contained in a receiver. The concentrated light is subsequently absorbed as thermal energy by a heat transfer fluid flowing through the absorber tubes. Finally, a thermodynamic power cycle (e.g. power block) converts the thermal energy contained in the high-temperature heat-transfer fluid into electricity. The heat transfer fluid exiting the receiver may have a temperature between 200° C. and 600° C. Because of the inclusion of the power block, a CSP power plant is typically deployed at the utility-scale for electricity generation and can be more capital-intensive than an equivalent utility-scale PV power plant. However, in addition to electricity generation, CSP systems can generate heat for a variety of applications such as heating, cooling, water desalination, process heat and complimentary heat addition to other energy sectors such as geothermal and fossil-fuel power plants. With the reducing cost of emerging new technologies in the near future, CSP may be very competitive in the energy market. Thus, CSP and PV can be complementary to each other in future renewable-dominating electricity markets, along with other types of renewable energy such as wind, geothermal and biomass.

CSP technologies include parabolic trough, linear Fresnel, power tower (also called central receiver) and dish/engine technologies. The global CSP installed capacity has reached over 6 GWe as of 2016. Linear Fresnel systems include a low-profile array of tracking primary reflectors (e.g. mirrors) and a fixed receiver containing at least one absorber tube and an optional secondary reflector. Fresnel technology can be a relatively low-cost technology compared to parabolic trough technology, but historically suffers from low performance metrics. The secondary reflector is a key component used to improve optical performance of a linear Fresnel CSP plant. The shape of a secondary reflector is particularly influential in affecting the solar power captured by the absorber tube(s) and thus the system's total optical performance. Thus, there remains a need for improved secondary reflectors and methods for designing these improved secondary reflectors.

SUMMARY

An aspect of the present disclosure is a device that includes a reflecting surface having a length aligned along a first axis (z), where a cross-section of the reflecting surface in a plane perpendicular to the first axis (z) forms a curve comprising a concave section positioned between a first endpoint and a second endpoint, at least a portion of the concave section is accurately approximated by a polynomial equation, an aperture is formed by a straight line connecting the first endpoint to the second endpoint, and the concave section is configured to focus a plurality of beams of light passing through the aperture onto a focal point.

In some embodiments of the present disclosure, the focal point may be positioned at least partially within an area enclosed by the concave section and the straight line. In some embodiments of the present disclosure, the focal point may be positioned outside an area enclosed by the concave section and the straight line.

In some embodiments of the present disclosure, the plane may contain a second axis (x) that is perpendicular to the first axis (z) and a third axis (y) that is perpendicular to the second axis (x), and the third axis (y) may intersect the second axis (x) to form a dimensionless xy-coordinate system having an origin of (0, 0) at the intersection. The concave section may be positioned in the dimensionless xy-coordinate system, the concave section may include a first portion that starts at the first endpoint positioned at (1, 0) and terminates at an intermediate point at (0, D), and the concave section may include a second portion that starts at the second endpoint positioned at (-1, 0) and terminates at the intermediate point. D may be a dimensionless number between 0.40 and 1.00.

In some embodiments of the present disclosure, the second portion may be a symmetrical, mirror-image of the first portion. In some embodiments of the present disclosure, the first portion may have a slope of 1.0 at the intermediate point. In some embodiments of the present disclosure, the first portion may have a slope not equal to 1.0 at the intermediate point. In some embodiments of the present disclosure, the first portion may be accurately described within the xy-coordinate system by the polynomial equation.

In some embodiments of the present disclosure, the polynomial equation may be a third-order polynomial equation defined as $y=a'x^3+b'x^2+c'x+d$, a' may be between $-1.0$ and $-0.10$, b' may be between $-0.70$ and $-0.01$, c' may be between 0.03 and 0.30, d may be between 0.40 and 1.0, and a', b', c', and d may all be dimensionless numbers. In some embodiments of the present disclosure, the first portion may be accurately described as indicated by a regression $R^2$ value between 0.999 and 1.0 inclusively.

In some embodiments of the present disclosure, the device may further include an absorber tube positioned at the focal point. In some embodiments of the present disclosure, the absorber tube may be configured so that a heat-transfer fluid can flow through the absorber tube.

An aspect of the present disclosure is a method that includes defining a geometric configuration of a field of primary reflectors and the optics of the field, such that the field can receive and reflect a light; defining a width of an aperture of a secondary reflector configured to receive at least a portion of the light, such that the portion passes through the aperture; and calculating a profile for a reflecting surface of the secondary reflector, where the aperture is positioned between a first endpoint and a second endpoint of the profile, the secondary reflector includes the aperture, and the profile resulting from the calculating, results in the reflecting surface maximizing the portion reflected off of the reflecting surface and directed to a focal point.

In some embodiments of the present disclosure, the calculating of the profile may include placing a first point of the profile on the first endpoint; a first calculating, for the first point, of a principal incidence of a fraction of the portion striking the first point; a second calculating, for the first point, of at least one variable that directs the fraction towards the focal point; and repeating the first calculating and the second calculating for n additional points until the profile is defined, including an $n^{th}$ point of the profile placed on the second endpoint, where n is between 10 and 1000, and at least a portion of the profile is accurately described by a polynomial equation.

In some embodiments of the present disclosure, the variable may include at least one of a target reflection and/or a surface normal to the first point and the $n^{th}$ point. In some embodiments of the present disclosure, n may be determined by defining a step distance between neighboring points. In some embodiments of the present disclosure, n may be between 100 and 400. In some embodiments of the present disclosure, the method may further include, prior to the defining of the width of the aperture, defining a distance between the aperture and the field of primary reflectors.

In some embodiments of the present disclosure, the method may further include, repeating the defining of the distance and the calculating m times until a final profile is obtained, where the final profile results in a final reflecting surface that maximizes the portion directed to the focal point, and m is between 1 and 100. In some embodiments of the present disclosure, the field of primary reflectors may include a linear Fresnel primary reflector.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIG. 4 also shows variables associated with equations (2) through (5) for a polar coordinate system for approximating the surface (e.g. profile) of a CPC design.

FIG. 6 also shows variables associated with equations (6) through (10) for an xy-coordinate system that utilizes sinusoidal functions to approximating the surface of a butterfly design.

| REFERENCE NUMBERS | |
|---|---|
| 100 | concentrating solar power plant |
| 110 | light source |
| 115 | light |
| 120 | primary reflector field |
| 130 | primary reflector |
| 135 | surface |
| 140 | receiver |
| 150 | secondary reflector |
| 155 | surface |
| 160 | absorber tube |
| 200 | aperture |
| 400 | glass envelope |
| 410 | profile |
| 420 | cusp |
| 700 | extremum |
| 1400 | method |
| 1410 | defining the primary reflector field |
| 1420 | defining the secondary reflector aperture |
| 1430 | calculating the secondary reflector profile |
| 1431 | defining the position of starting edge point |
| 1432 | calculating the principal incidence |
| 1433 | calculating dependent variables for current point on profile |
| 1434 | calculating the position of the next point |
| 1435 | determining whether the profile is complete |
| 1440 | optimizing the secondary reflector height |
| 1450 | proposed secondary reflector design |
| 1500 | point on secondary reflector profile |
| 1600 | focal point |

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

The present disclosure relates to adaptive methods for designing secondary reflectors having improved performance characteristics. As described herein, the design methods do not assume any pre-defined analytical form or shape, although it will be shown that the methods described herein result in a generally preferred shape that is accurately described mathematically. This preferred shape is attained through an adaptive process that maximizes the energy collection received by the receiver's absorber tube. The low performance of existing linear Fresnel technologies comes from the fact that a large number of design parameters exist in a Fresnel system's design, including geometric and optical parameters for each collector component and no robust numerical method exists that can fully optimize such a system. The methods described herein, and the resultant secondary reflector designs, address these deficiencies.

Figure 1:
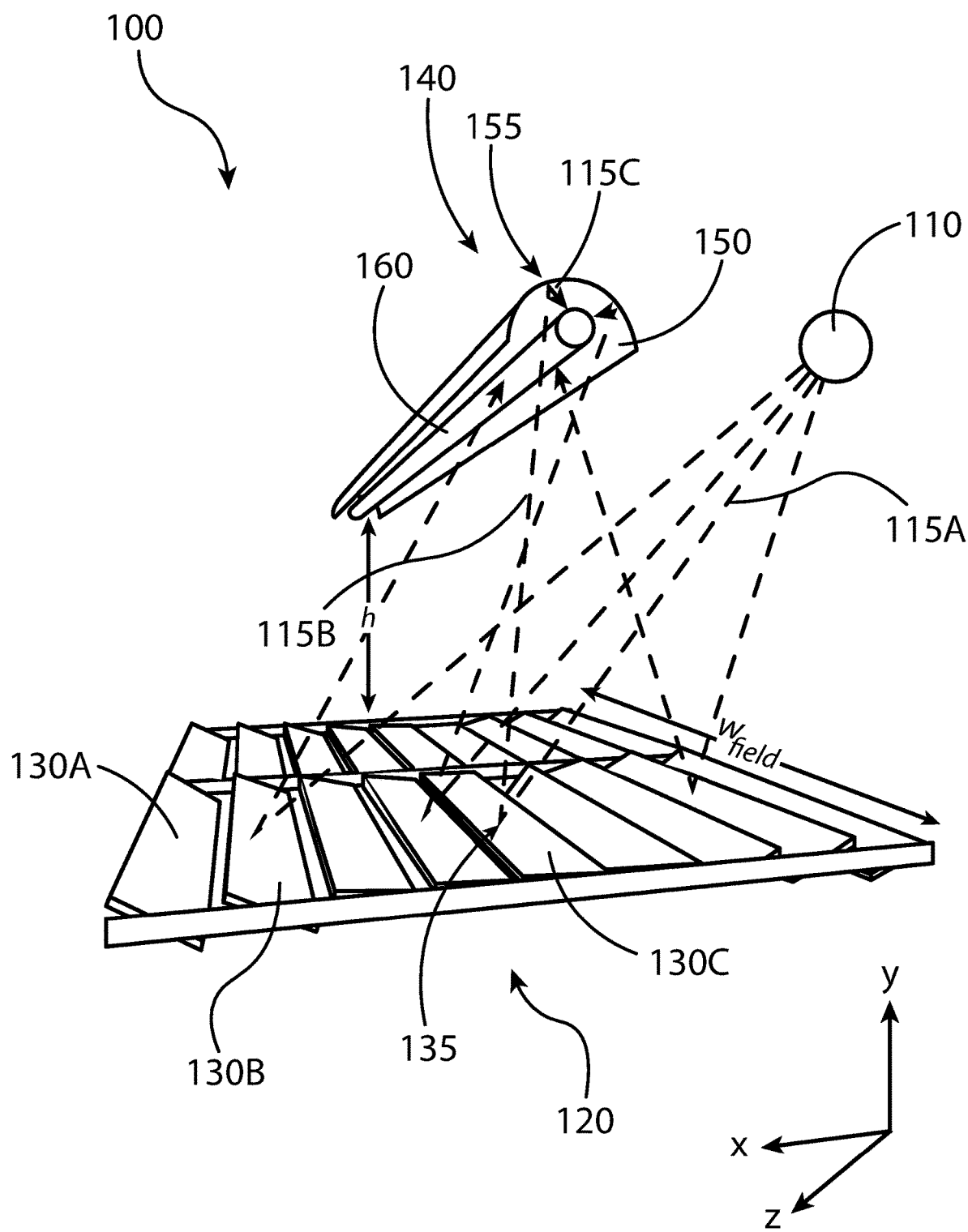
FIG. 1 illustrates a concentrating solar power plant utilizing a receiver having a secondary reflector, according to some embodiments of the present disclosure.

FIG. 1 illustrates a concentrating solar power (CSP) plant 100 utilizing linear Fresnel concepts, according to some embodiments of the present disclosure. This example of a CSP plant 100 includes a primary reflector field 120 configured to receive light 115 (e.g. sunlight) from a light source 110 (e.g. the sun). The primary reflector field 120 includes at least one, and often a plurality of primary reflectors 130 (FIG. 1 illustrates a total of 18 primary reflectors, generally called out using reference number 130, with three specifically called out; 130A, 130B, and 130C) that collect and concentrate the light 115 onto a receiver 140 having a secondary reflector 150 and an absorber tube 160. In some situations, the secondary reflector 140 may be utilized to collect a larger percentage of the light 115 received by the primary reflectors 130, such that a larger percentage of the light 115 is directed onto the absorber tube 160, ultimately resulting in a higher power production output than could be achieved by a CSP plant not utilizing a secondary reflector 150. Referring again to FIG. 1, the light source 110 produces light 115A that strikes a surface 135 of a primary reflector 130C, which reflects at least a portion of the light 115B towards the receiver 150. A portion of the light 115B reflected by the surface 135 of the primary reflector 130C may then strike against a surface 155 of the secondary reflector 150, resulting in a portion of the light 115C being reflected by the surface 155 and directed towards the absorber tube 160, where the light 115C is absorbed, resulting in the transfer of heat to a heat-transfer fluid (not shown) configured to flow through the receiver absorber tube 160. Referring again to FIG. 1, the light 115 can be visualized as individual beams or rays of light that travel in a linear path.

As shown in FIG. 1, an absorber tube 160 may be in the form of a pipe and/or tube, or any other suitable conduit, with the heat-transfer fluid flowing through the pipe and/or tube. In some embodiments of the present disclosure, an absorber tube 160 may have a length between 0.5 meters and 10 meters long (in the z-axis direction of FIG. 1). An absorber tube 160 may have in outside diameter between 2 cm and 20 cm. Examples of a heat-transfer fluid, which flows through the absorber tube 160 and receives the solar energy may be a liquid (e.g. an oil, water, a molten salt, sodium) a solid (e.g. sand) and/or a gas (e.g. air and/or steam). Similarly, a secondary reflector 150 may have a length between 0.5 meters and 10 meters long. The receiving/reflecting surface 155 may be constructed of a polished metal and/or polymer, or any other sufficiently reflective material that can withstand the high operating temperatures of the system. In some embodiments of the present disclosure, the surface 155 may include a high-temperature resistant glass coating. The thickness of the receiving/reflecting surface 155 may be between 0.5 mm and 10 mm.

Figure 2:
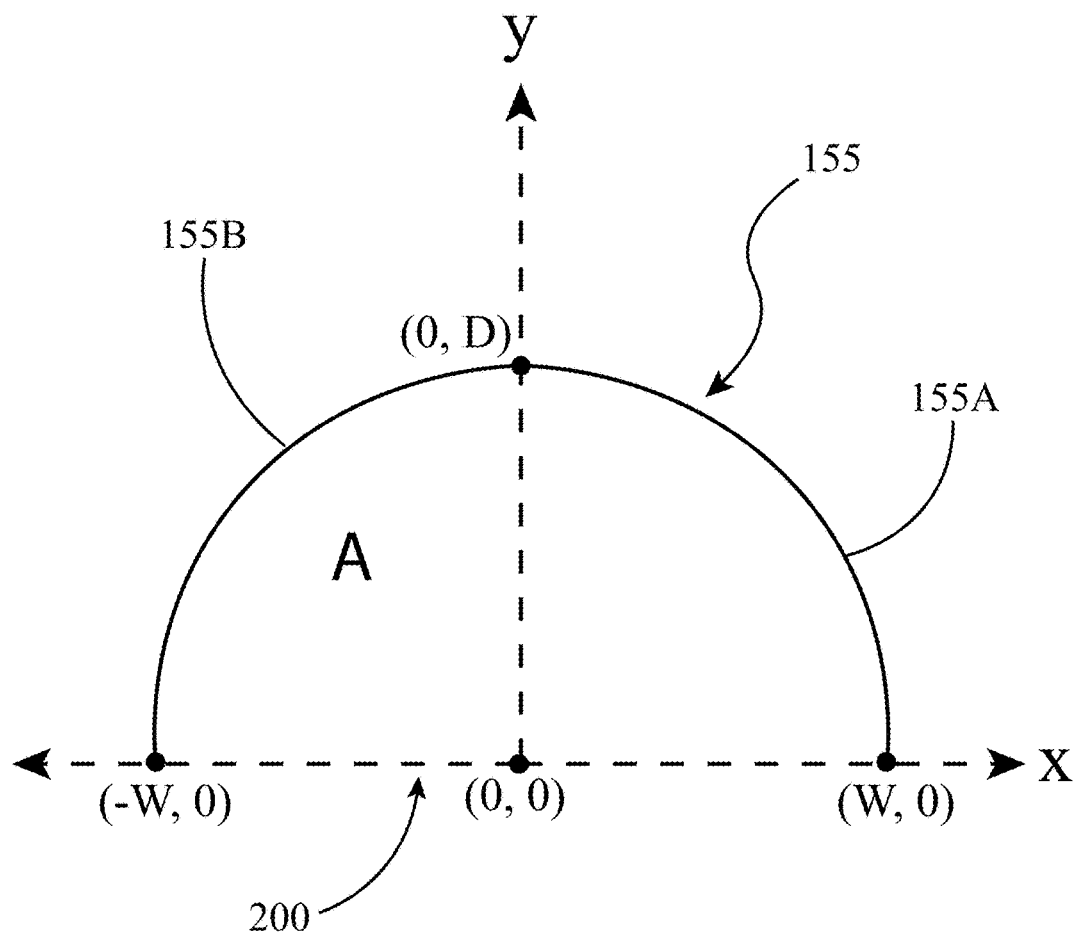
FIG. 2 illustrates a cross-sectional view of the receiving/reflecting surface of the secondary reflector (without a cusp) shown in FIG. 1, where the cross section is relative to the xy-plane, according to some embodiments of the present disclosure.

FIG. 1 illustrates a receiving/reflecting surface 155 for the secondary reflector having a curved cross-section in the xy-plane. For the example shown in FIG. 1, any cross-section in the xy-plane, along the z-axis (e.g. length dimension) of the receiving surface 155 of the secondary reflector 150 will result in a similar or identical curve in two-dimensional space. FIG. 2 illustrates a cross-section (in the xy-plane) for the exemplary surface 155 of the secondary reflector 150 shown in FIG. 1, where the cross-section includes a first half of the surface 155A connected to a second half of the surface 155B at the apex (or maximum) of secondary reflector. Thus, in some embodiments of the present disclosure, a secondary reflector may be constructed of a first half of the secondary reflector that is substantially the mirror image of a second half of the secondary reflector, having corresponding receiving/reflecting surfaces (155A and 155B). The two halves of the surface (155A and 155B) may also be substantially symmetrical. The first half of the surface 155A may connect with the second half of the surface 155B at a point (0, D) in space designated by the xy-coordinates, where D refers to a depth dimension (e.g. measured in feet, meters, etc.). In addition, both halves of the surface (155A and 155B) may be defined by a width dimension in the xy-plane, such that the first half of the surface 155A may terminate at a point in two-dimensional space at the xy-coordinates of (−W, 0) and where the second half of the surface 155B may terminate at a point in two-dimensional space at the xy-coordinates of (W, 0), where W is equal to one-half of the total width of the secondary reflector 150 as measured from the reflecting/receiving surface 155.

Figure 4:
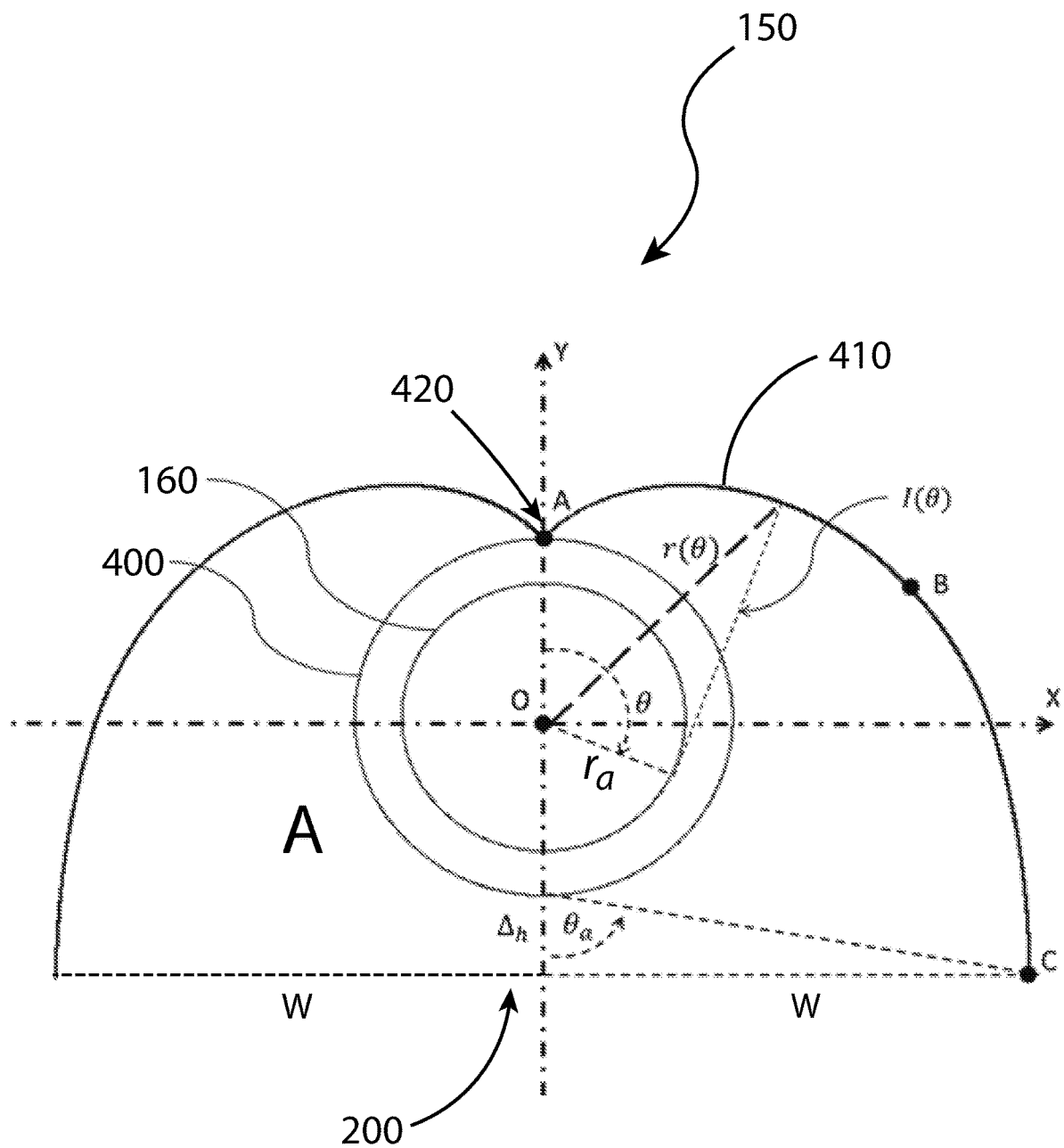
FIG. 4 illustrates a profile of a receiving/reflecting surface of secondary reflector having a compound parabolic concentrator (CPC) design.
Figure 16:
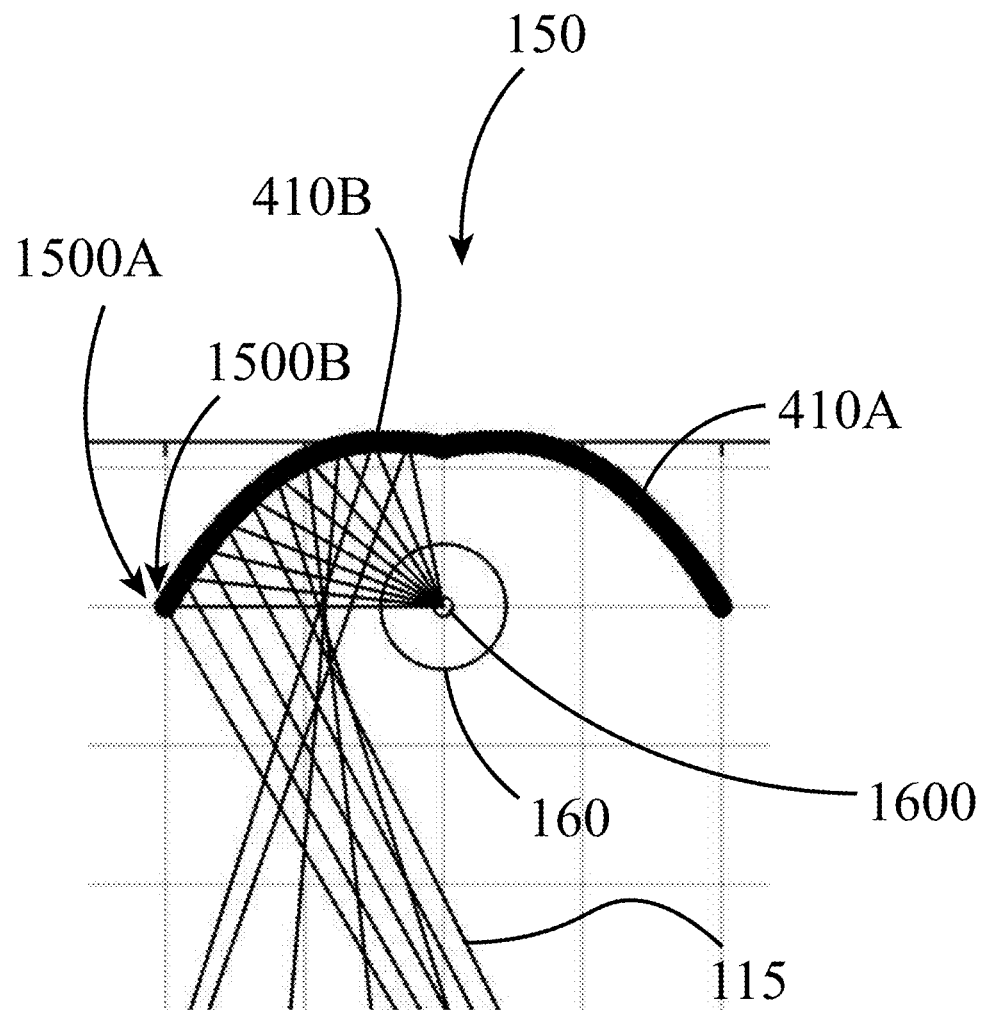
FIG. 16 illustrates an example of a profile (e.g. a cross-section of a receiving/reflecting surface) of a secondary reflector obtained using the method illustrated in FIG. 14, according to some embodiments of the present disclosure.

FIG. 2 also illustrates how an area of the cross-section may be defined, labeled A, where A is bounded by the borders defined by the surfaces (155A and 155B) and a straight line drawn between the points (−W, 0) and (W, 0). In some embodiments of the present disclosure, the absorber tube may be placed entirely within the area, A, as shown in FIG. 4. In other cases, the absorber tube may be positioned partially within the area, A, as shown in FIG. 16. In still other examples, the absorber tube may be positioned outside of the area, A.

Thus, the receiving/reflecting surface 155 of a secondary reflector 150 constructed of a first half that is symmetrical and the mirror image of a second half may be uniquely defined by a mathematical representation of a curve fitted to the cross-section of the receiving/reflecting surface 155. This concept is elaborated below. Referring again to FIG. 2, the surface 155 of the secondary reflector 150 forms an opening referred to herein as an aperture 200 having a width spanning between the points (−W, 0) and (W, 0) on the x-axis. Thus, the absolute width of the aperture 200 corresponds to 2*W.

Figure 3:
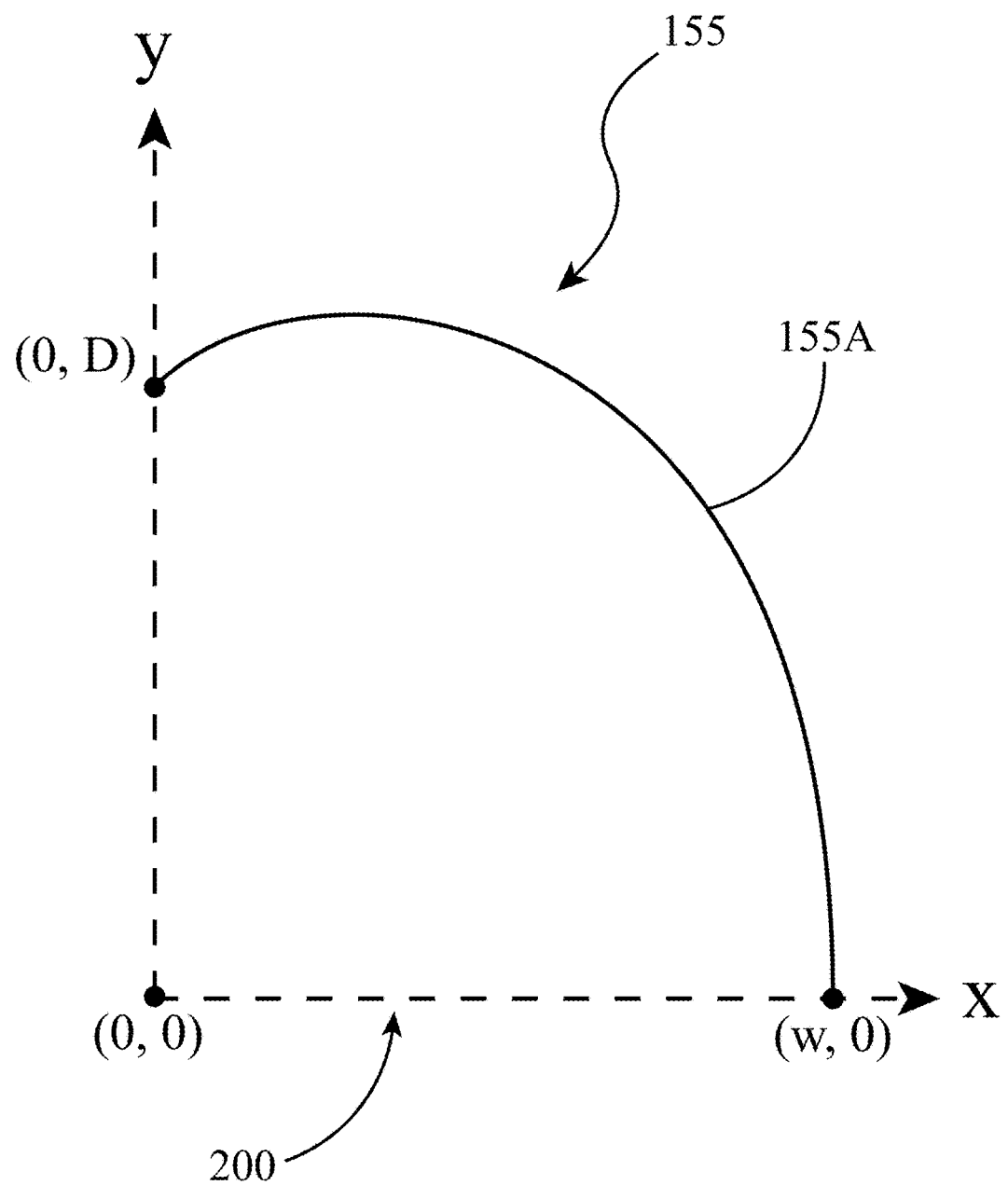
FIG. 3 illustrates a cross-sectional view of a receiving/reflecting surface of a secondary reflector having a cusp, where the cross section is relative to the xy-plane, according to some embodiments of the present disclosure.

FIG. 3 illustrates a curve resulting from a cross-section of a first half of a receiving/reflecting surface 155A for a secondary reflector having a shape referred to as a compound parabolic concentrator (CPC). The second half (not shown) of the receiving/reflecting surface 155 of the secondary reflector 150 having a CPC design is typically a symmetrical, mirror-image of the first half of the surface 155A. The curve resulting from the cross-section of the first half of the surface 155A may be approximated (e.g. traced) by a mathematical equation that describes a position for each point of the surface 155A of the secondary reflector 150 in two-dimensional space. Thus, for a cross-section in the xy-plane, the shape of the secondary reflector receiving/reflecting surface 155A may be described by a mathematical function generally described as, $$y = f(x) \quad (1)$$

for an xy-coordinate system where x is the position of a point on the surface 155A in the x-axis direction (width), and y is the position of the point on the surface 155A in the y-axis direction (depth). As will be shown below, a characteristic equation that describes the curve approximating the shape of the surface 155A of the secondary reflector in the xy-plane of a compound parabolic reflector is poorly described by a second-order or third-order polynomial equation, using the xy-coordinate system. A better fit for a CPC secondary reflector shape may be better achieved using a polar coordinate system, as shown in FIG. 4.

Referring to FIG. 4, the two-dimensional curve resulting from a cross-section of the secondary reflector's receiving/reflecting surface 155 in the xy-plane, referred to herein as the profile 410 of the surface, may be defined for a CPC secondary reflector using the following equation, $$r(\theta) = \frac{r_a}{\cos(\theta - \tan^{-1}(I(\theta)/r_a))} \quad (2)$$

where $r_a$ is the radius of the absorber tube, $\theta$ is the polar coordinate angle, and $I(\theta)$ is the tangent distance from the absorber tube to the CPC secondary reflector's receiving/reflecting surface. The CPC acceptance angle ($\theta_a$) may influence the range of accepted angles for the CPC design by defining the secondary reflector's aperture 200 width (W) and distance from the absorber tube 160 to a secondary edge ($\Delta_h$). In some embodiments, the involute may touch the absorber tube 160 but a gap may exist between the absorber tube 160 and the CPC cusp 420 due to a glass envelope 400 that may encompass the absorber tube 160. The involute and parabolic shapes may be adjusted by a factor of $\theta_0$; if there is no gap, the value of $\theta_0$ is equal zero. The involute is defined by the bounds $$\left[0, \theta_a + \frac{\pi}{2}\right]$$

and illustrated by the line segment $\overline{AB}$ in FIG. 4. The macro-focal parabola is bounded by $$\left[\theta_a + \frac{\pi}{2}, \frac{3\pi}{2} - \theta_a\right]$$

and illustrated by the line segment $\overline{BC}$ in FIG. 4. The equations for $I(\theta)$ are detailed in equations (3)-(5) as follows:

$$I(\theta) = \begin{cases} r_a(\theta + \theta_0), & 0 \leq \theta \leq \theta_a + \frac{\pi}{2} \\ \frac{r_a\left(\theta + \theta_a + \frac{\pi}{2} + 2\theta_0 - \cos(\theta - \theta_a)\right)}{1 + \sin(\theta - \theta_a)}, & \theta_a + \frac{\pi}{2} < \theta \leq \frac{3\pi}{2} - \theta_a \end{cases} \quad (3)$$

$$\theta_a = \tan^{-1}\left(\frac{r_w}{\Delta_h}\right) \quad (4)$$

$$\theta_0 = \sqrt{\frac{r_g^2}{r_a^2} - 1} - \cos^{-1}\frac{r_a}{r_g} \quad (5)$$

Figure 5:
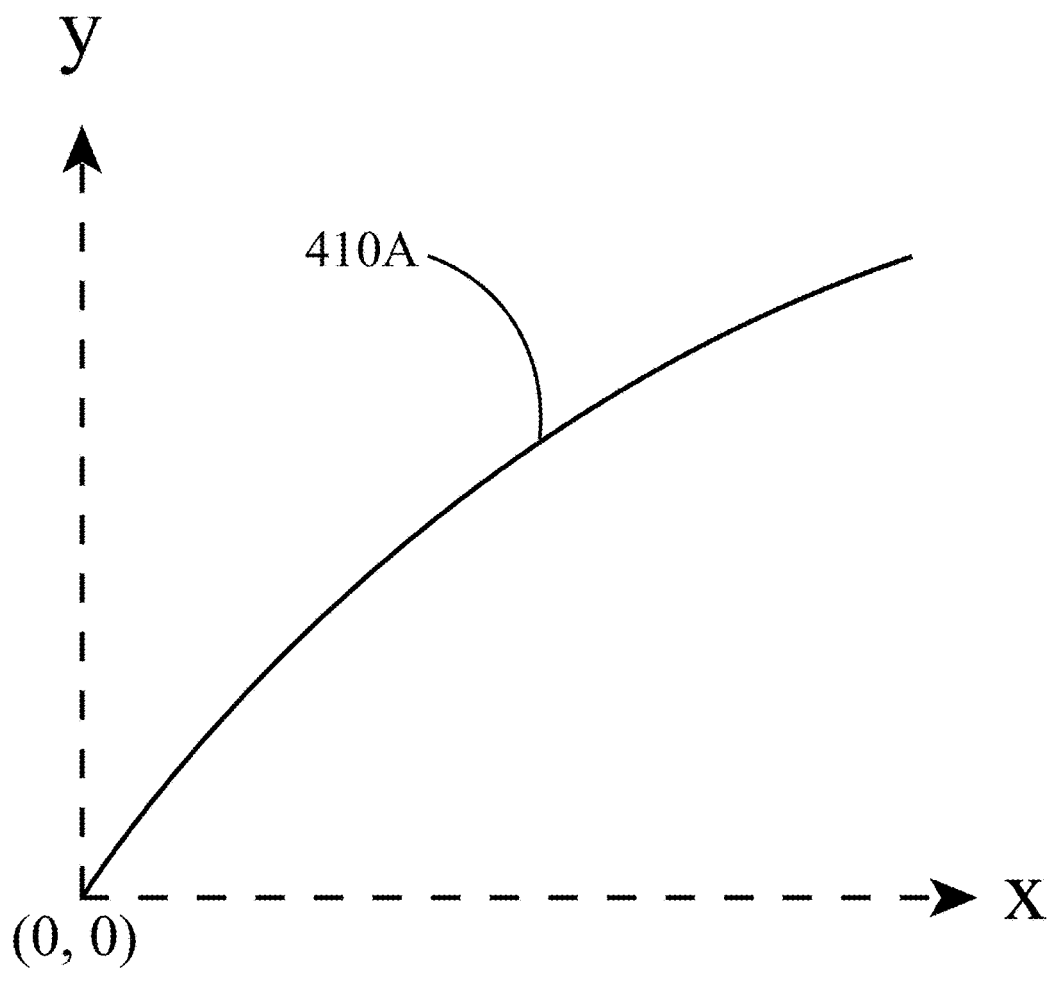
FIG. 5 illustrates a profile of a receiving/reflecting surface of a secondary reflector having a butterfly design.
Figure 6:
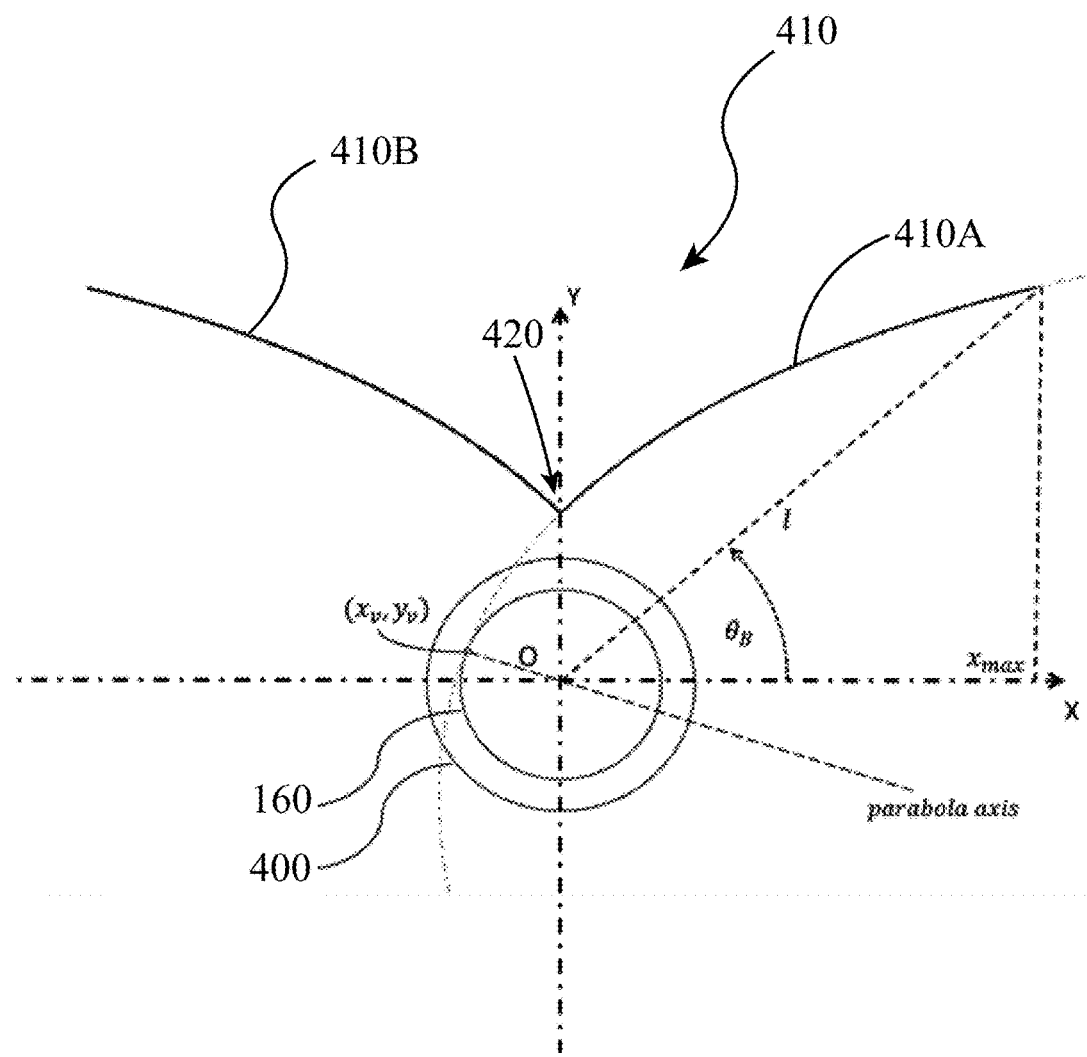
FIG. 6 illustrates a profile of a receiving/reflecting surface of a secondary reflector having a butterfly design.

FIG. 5 illustrates another exemplary profile resulting from a cross-section of a surface of a secondary reflector in the xy-plane, in this case for a secondary reflector having what is referred to herein as a butterfly design. As with the CPC design, only a first half of the surface's profile 410A of the secondary reflector is shown. The second half (not shown) of the profile for a butterfly design is typically a symmetrical, mirror-image of the first half of profile 410A. Referring to FIG. 6, the profile 410 of a butterfly design may also be described as two parabolic wings (two halves 410A and 410B) that are used to receiving, reflecting, and focusing light on the absorber tube 160. The two halves of such a secondary reflector may be fashioned by rotating a parabola by an angle of ($\theta_B$). The parabola's vertex may be defined by a focal length and the angle of rotation. For the case shown in FIG. 6, the focal length is the radius of the absorber tube's outer layer or glass envelope 400. The parabola's focal point is at the center of the absorber tube (0, 0) and the vertex of the parabola is defined by ($x_v$, $y_v$), as seen in FIG. 6. The profile 410 for the first half of the symmetric parabola may be defined by the equation below:

$$x = x'\cos(\theta_B) + y'\sin(\theta_B);$$
$$y = -x'\sin(\theta_B) + y'\cos(\theta_B) \quad (6)$$

$$y' = y_v + \frac{(x' - x_v)^2}{4r_a} \quad (7)$$

where $\theta_B$ is defined by the primary field width and the height of the absorber tube 160 above the primary reflectors. Other constants in equation (6) and (7) are defined as follows:

$$\theta_B = \frac{\tan^{-1}\frac{w_{field}}{h}}{2} \quad (8)$$

$$x_v = (-r_a\cos(\theta_B));\ y_v = r_a\sin(\theta_B) \quad (9)$$

$$x_{max} = \frac{\cos(\theta_B) * \sqrt{2r_a}}{\sqrt{1 - \sqrt{\frac{1}{1 + w_{field2+h2}}}}} \quad (10)$$

In Equation (8), $w_{field}$ refers to the width of the primary reflector field 120 and h to the height of the absorber tube 160 above the primary reflectors 130 (see FIG. 1).

Figure 7:
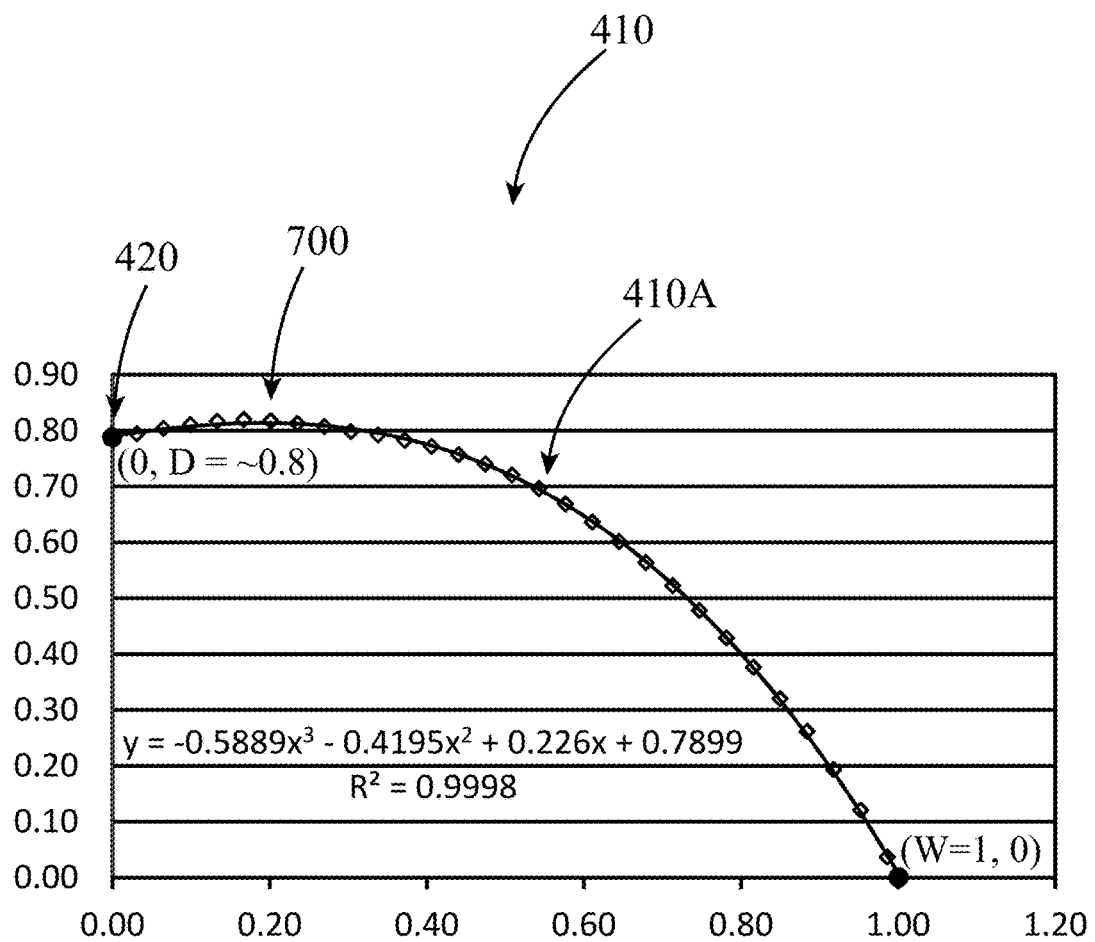
FIG. 7 illustrates the profile (for one half of a secondary reflector) for a receiving/reflecting surface of a secondary reflector (with a cusp) designed according to methods described herein, where the profile is accurately described by a third-order polynomial equation, according to some embodiments of the present disclosure.

FIG. 7 illustrates a profile 410A of the first half of a receiving/reflecting surface of a secondary reflector designed by the methods described herein. As described above, the profile 410 is obtained from a cross-section of the secondary reflector's receiving/reflecting surface in the xy-plane. The secondary reflector's surface profile 410A shown in FIG. 7 is referred to herein as a "proposed" design and corresponds generally to secondary reflector having a surface profile that is accurately described by a third-order polynomial. The second half of the surface profile (not shown) resulting from the proposed secondary reflector design is a symmetrical, mirror-image of the first half of the profile 410A.

As used herein, a polynomial equation is described as, $$y=f(x)=ax^n+bx^{n-1}+cx^{n-2}+\ldots a'x^3+b'x^2+c'x+d \quad (11)$$

where x describes the position of a point on the x-axis of the surface of the secondary reflector in two-dimensional space and the exponents of x are integer values greater than or equal to one and the parameters of x are any real number (a, b, c, a', b', c', and d). As described above, y refers to the position of the corresponding point on the secondary reflector's receiving/reflecting surface on the y-axis. The largest numerical value of an exponent in equation (11) is referred to herein as the "order" of the polynomial. Thus, a third-order polynomial that fits and approximates the profile of the surface of a secondary reflector may be represented as, $$y=f(x)=a'x^3+b'x^2+c'x+d \quad (12)$$

The profile 410A shown in FIG. 7, for half of the secondary reflector's surface, was obtained by normalizing the width (W) of the cross-section of the first half of the secondary reflector to one (1.0), while maintaining the aspect ratio of the secondary reflector. The aspect ratio is referred to herein as the depth (D) of the secondary reflector divided by one-half of the total width (2W is equal to the total width) of the secondary reflector, as measured from the reflecting/receiving surface. In addition, the leading edge of the secondary reflector, in the y-axis direction (e.g. depth direction) was placed on the x-axis (e.g. y=0). This standardization procedure allows the profiles of different secondary reflector profiles to be compared on an equivalent basis, without the parameters being skewed due to different scales. All of the profiles below, that were fitted mathematically were consistently analyzed using the procedure described in this paragraph.

Referring again to FIG. 7, a third-order polynomial provides a good mathematical fit of the profile for this embodiment of a secondary reflector (e.g. one embodiment of the proposed design), with an $R^2$ value of greater than 0.999, with a dimensionless depth (D) value of about 0.799 and a dimensionless width (where W equals one half of the secondary reflector's total width) value of 1.0. The profile 410 shown in FIG. 7 includes a "cusp" 420 and an extremum 700, in this case a maximum. As used herein, an "extremum" refers to a point on a curve having a slope equal to zero or infinity, which corresponds to at least one of a point of discontinuity, a maximum, or a minimum. Thus, a cusp is also an extremum, having a slope of infinity and the extremum on the profile labeled 700 corresponds to a local maximum having a slope of zero. Including a cusp in the surface of a secondary reflector may enable a larger percentage of the light (not shown) to be captured by the secondary reflector. However, inclusion of a cusp in the design of a secondary reflector may also complicate the manufacturing process and increase manufacturing costs. Thus, some embodiments of a secondary reflector may not include a cusp, while others may include at least one cusp.

Figure 8:
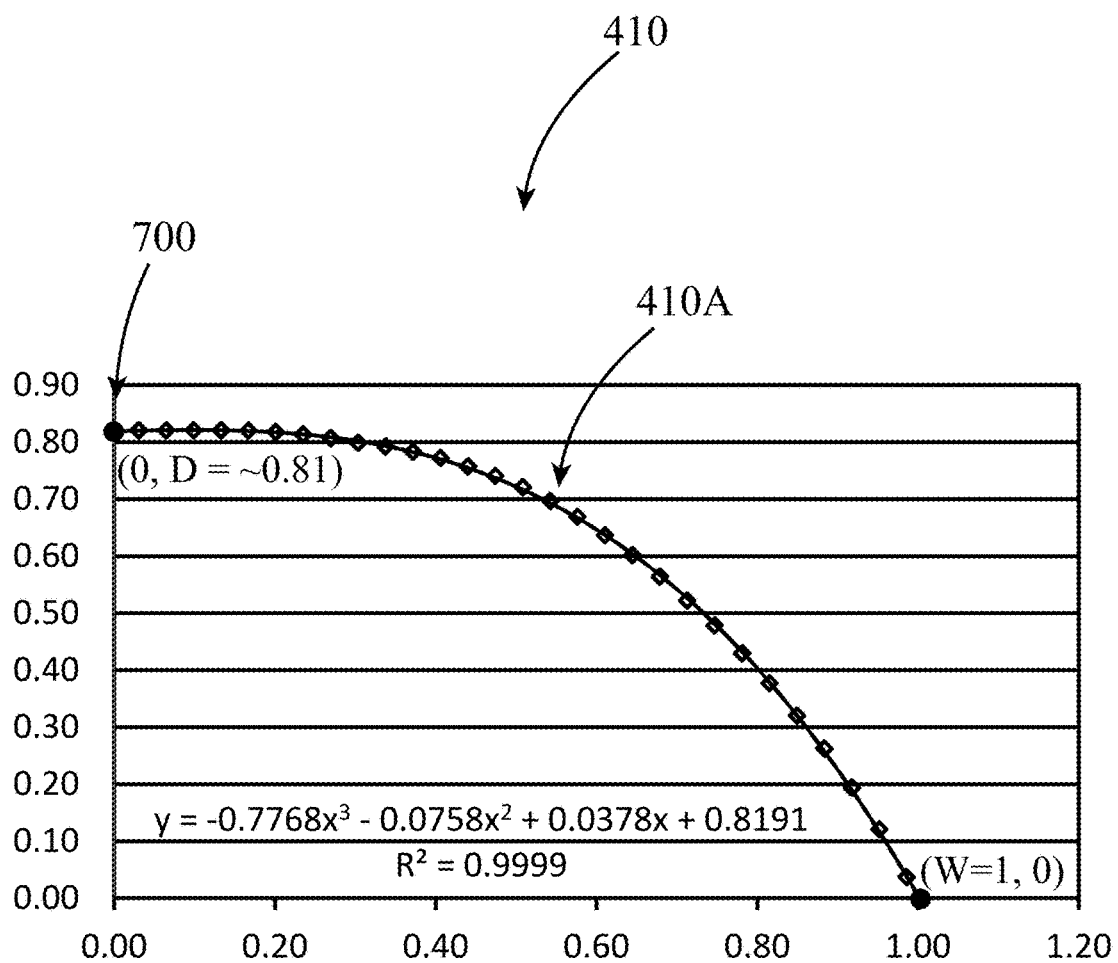
FIG. 8 illustrates the profile (for one half of a secondary reflector) for a receiving/reflecting surface of a secondary reflector (without a cusp) designed according to methods described herein, where the profile is accurately described by a third-order polynomial equation, according to some embodiments of the present disclosure.

FIG. 8 illustrates another embodiment of the present disclosure, a proposed design for a secondary reflector, without a cusp, where the profile 410 of the surface of the secondary reflector (410A representing a first half of the profile). Instead, the first half of the secondary reflector's surface meets/joins the second half of the secondary reflector's surface at a local maximum, i.e. extremum 700. For this example, this extremum 700 (e.g. a maximum having a slope of zero) occurs at point where the first half of the profile 410A joins with the second half of the profile (e.g. at the point where x=0 or (0, D)). The second half of the profile (not shown) may be a symmetrical, mirror-image of the first half of the profile 410A. As shown in FIG. 8, a third-order polynomial equation fits the profile 410A of the secondary reflector's receiving/reflecting surface very well with an $R^2$ value of greater than 0.999.

Figure 9:
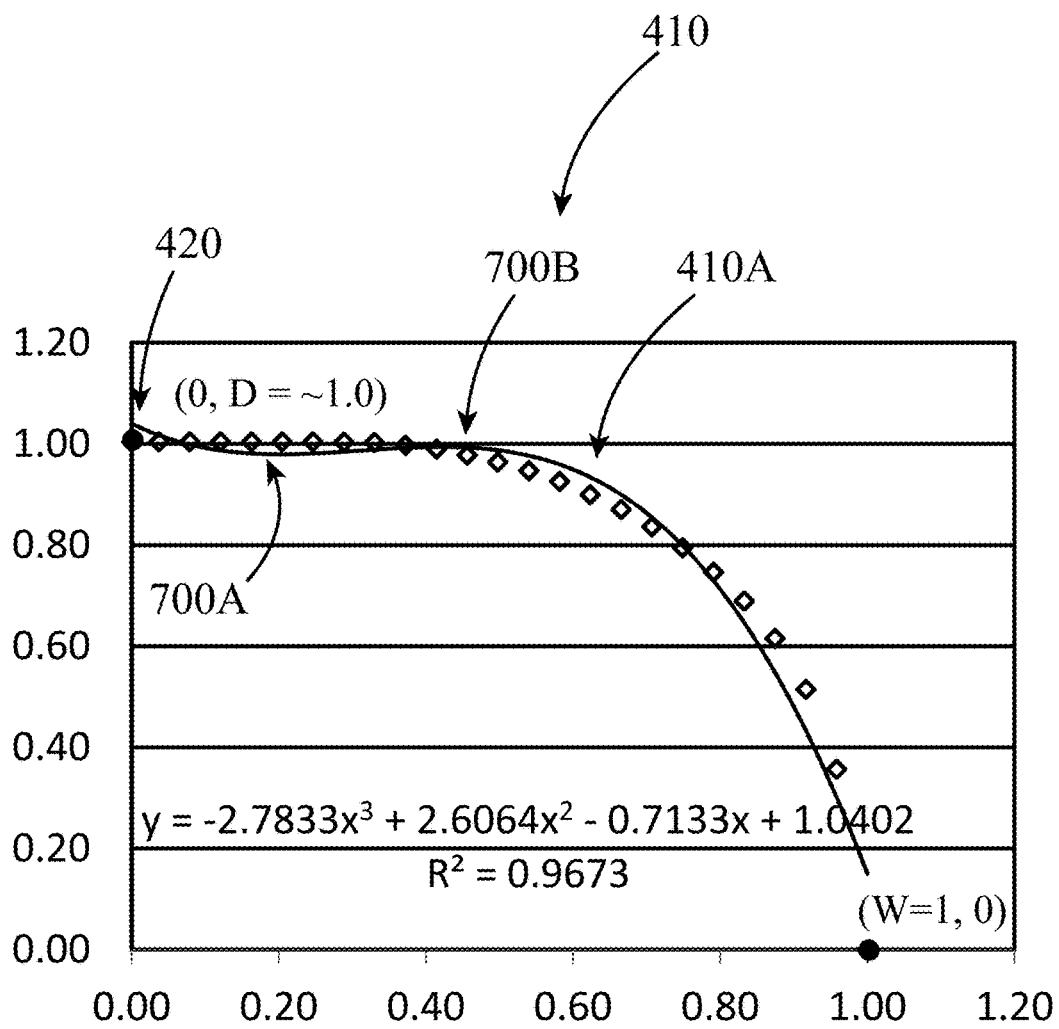
FIG. 9 illustrates the profile (for one half of a secondary reflector) for a receiving/reflecting surface of a secondary reflector (with a cusp) having a CPC design, where the profile is not accurately described by a third-order polynomial equation.

FIG. 9 illustrates a profile 410 obtained when fitting with a third-order polynomial equation the cross-section of a CPC secondary reflector's receiving/reflecting surface lacking a cusp. FIG. 9 illustrates that the fit is relatively poor (e.g.

$R^2<0.97$), and the shape of fitted equation does not accurately describe the actual profile of the secondary reflector. For example, the best fitting third-order polynomial produces a cusp 420, even though the actual CPC cross-section of the secondary reflector's surface has no cusp. In addition, the half of the profile 410A shown in FIG. 8 has two extrema, a local minimum, i.e. extremum, at 700A, and a local maximum, i.e. extremum, at 700B. Thus, fitting a third-order polynomial equation to the profile 410A of a secondary reflector having a CPC design results in a poor fit and equations (2)-(5) provided above result in a better approximation/fit of the shape of secondary reflector's receiving/reflecting surface.

Figure 10:
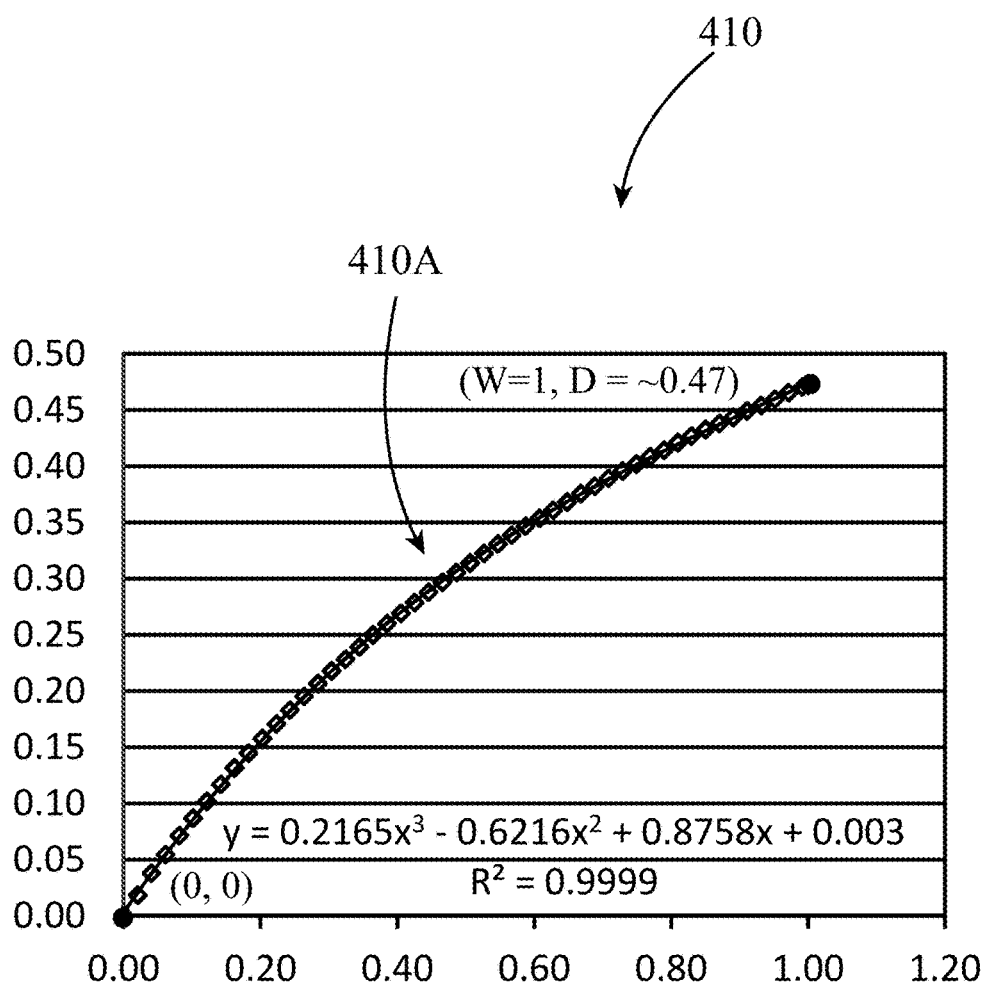
FIG. 10 illustrates the profile (for one half of a secondary reflector) for a receiving/reflecting surface of a secondary reflector (with a cusp) having a butterfly design.

FIG. 10 illustrates a profile 410 obtained when fitting a third-order polynomial equation to the cross-section of the receiving/reflecting surface of a secondary reflector having a butterfly design. FIG. 10 illustrates that a third-order polynomial equation may accurately fit the first half of the profile 410A of a secondary reflector having a butterfly design. However, the profile 410A resulting from the butterfly design differs from the proposed profile of the secondary reflector shown in FIG. 8, in that the butterfly design's profile 410A includes a cusp and/or a local minimum at the origin (the point where the first half of the profile 410A joins to the second half of the profile). In addition, a butterfly design is fundamentally different from the designs shown in FIGS. 7 and 8 in that its maximum depth occurs at a value of x equal to 1.0, or at the coordinates (W, D) instead of (0, D). In addition, at least some of the signs (e.g. + or −) for the parameters obtained by the third-order polynomial equation to fit the butterfly design differ between the parameters used in the third-order polynomial equations used to fit the designs summarized in FIGS. 7 and 8 (as well as the CPC design).

Thus, in summary, FIGS. 7-10 clearly illustrate that secondary reflector profiles obtained from the cross-sections of the receiving/reflecting surfaces in the xy-plane can differ greatly when these profiles are described mathematically using a third-order polynomial equation. Some of these differences are summarized in Table 1 below. Note that all numbers listed in Table 1 are dimensionless. See equation 12 for a reference to the parameters a', b', c', and d.

through the use of a secondary reflector 150, where the reflected sun's rays form a concentrated beam.

Various parameters in the system optics of a Fresnel collector CSP plant 100 may contribute to optical errors, including the finite-size of the sun's shape, imperfect primary reflector 120 specularity, primary reflector slope error, primary reflector tracking error, absorber tube position error, and/or errors associated with the secondary reflectors 150, all of which may contribute to reduced CSP plant energy efficiencies. One effect of these optical errors is a broadening of the reflected beam, relative to the original shape of the sun. For example, if the beam is significantly broadened, the receiver 140 may obstruct at least a portion of the reflected beam lying within the acceptance angle window of the receiver 140.

In some embodiments of the present disclosure, the root mean square (RMS) of the overall beam spread distribution (e.g. beam broadening) is estimated by assuming the sun shape and all system optical errors follow a Gaussian distribution:

$$\sigma_{total}^2 = \sigma_{sun}^2 + \sigma_{specularity}^2 + 4\times\sigma_{slope}^2 + 4\times\sigma_{track}^2 + 4\times\sigma_{receiver}^2 \quad (13)$$

where $\sigma_{specularity}$, $\sigma_{slope}$, $\sigma_{track}$ and $\sigma_{receiver}$ are the RMS for mirror specularity, mirror slope error, mirror tracking error, and receiver-related optical error, respectively. For embodiments, where the sun shape and/or some optical error sources are not a Gaussian distribution, the total beam distribution RMS $\sigma_{total}$ may be obtained through convolutions of individual distributions. The coefficients in Equation 13 may vary for other solar technologies such as parabolic trough, power tower, and dish/engine.

Figure 13:
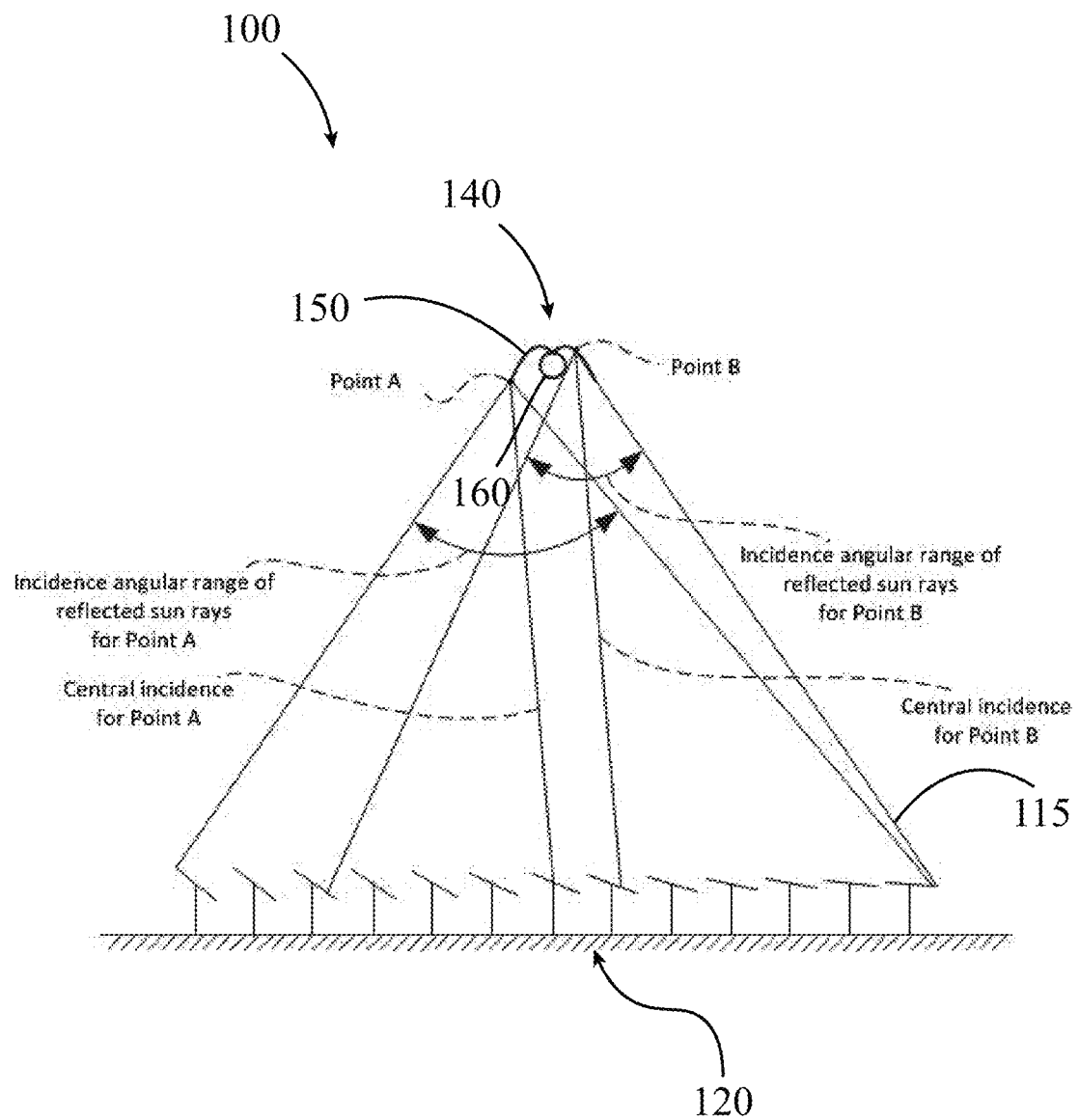
FIG. 13 illustrates the incidence of reflected sunlight to secondary reflectors, according to some embodiments of the present disclosure.

Based on the geometry of a linear Fresnel CSP plant 100, each point on a secondary reflector surface has on open line of sight to all of the primary reflector surfaces except the parts which are shaded or obstructed, for example by the receiver itself. Thus, the sun ray's incidence angular range will typically cover the entire primary reflector surface along its width. FIG. 13 illustrates the incidence angular range for two arbitrary points. Point A has an unobstructed view of the entire primary reflector field, and as a result, its incidence angular range covers the entire field. However, the incidence

TABLE 1

Secondary Reflector Surface Profile Comparison

| secondary reflector design type | a' | b' | c' | d | R2 | # maxima | # minima | f(x = 0) | f(x = W) | D/W |
|---|---|---|---|---|---|---|---|---|---|---|
| proposed design w/cusp | −0.59 | −0.42 | 0.23 | 0.79 | 1.00 | 1 | 1 | D | 0 | 0.78 |
| proposed design w/o cusp | −0.78 | −0.08 | 0.04 | 0.82 | 1.00 | 1 | 0 | D | 0 | 0.82 |
| CPC design w/cusp | −2.25 | 1.61 | −0.15 | 0.95 | 0.96 | 2 | 1 | D | 0 | 0.89 |
| CPC design w/o cusp | −2.78 | 2.61 | −0.71 | 1.04 | 0.97 | 2 | 1 | D | 0 | 1.00 |
| butterfly design | 0.22 | −0.62 | 0.88 | 0.00 | 1.00 | 0 | 1 | 0 | D | 0.47 |

Figure 11:
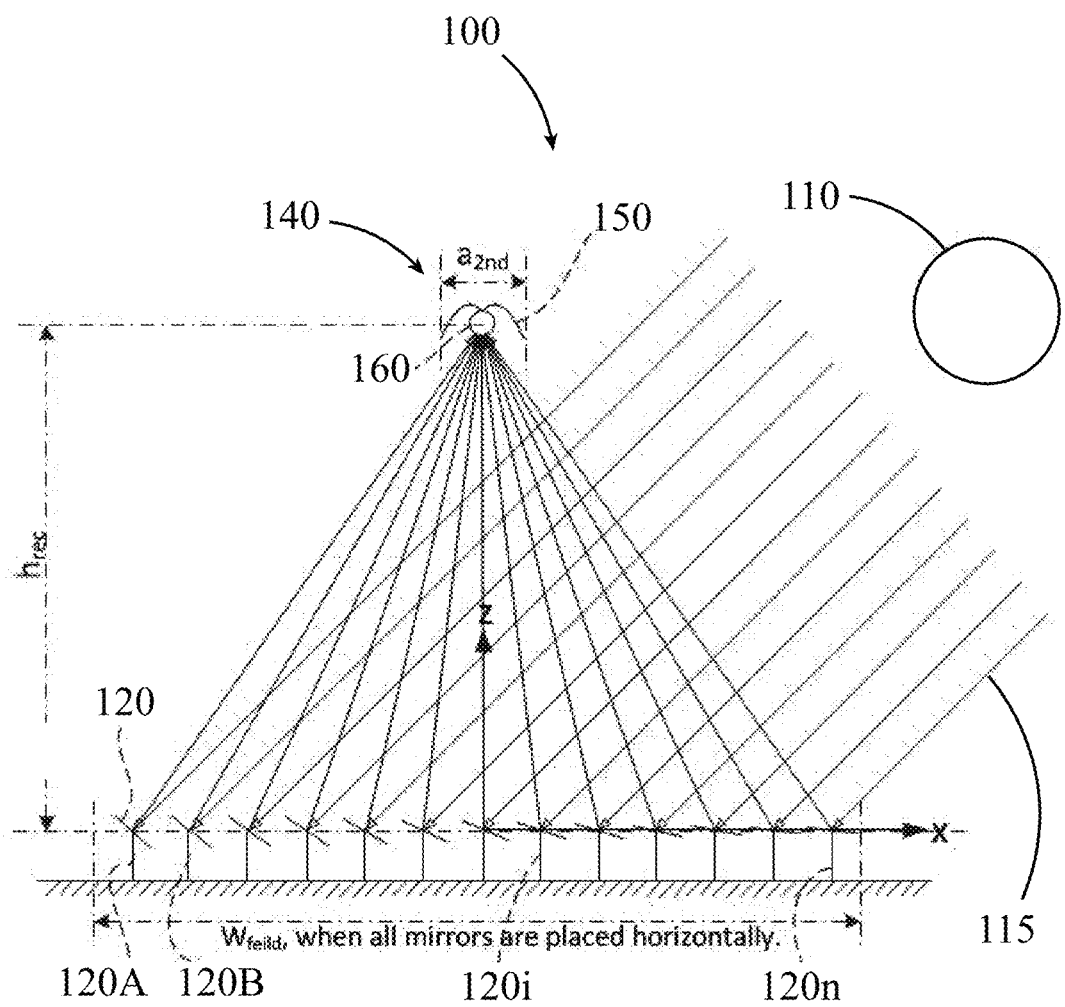
FIG. 11 illustrates various geometric variables and/or parameters of a CSP plant utilizing Fresnel design features, according to some embodiments of the present disclosure.
Figure 12:
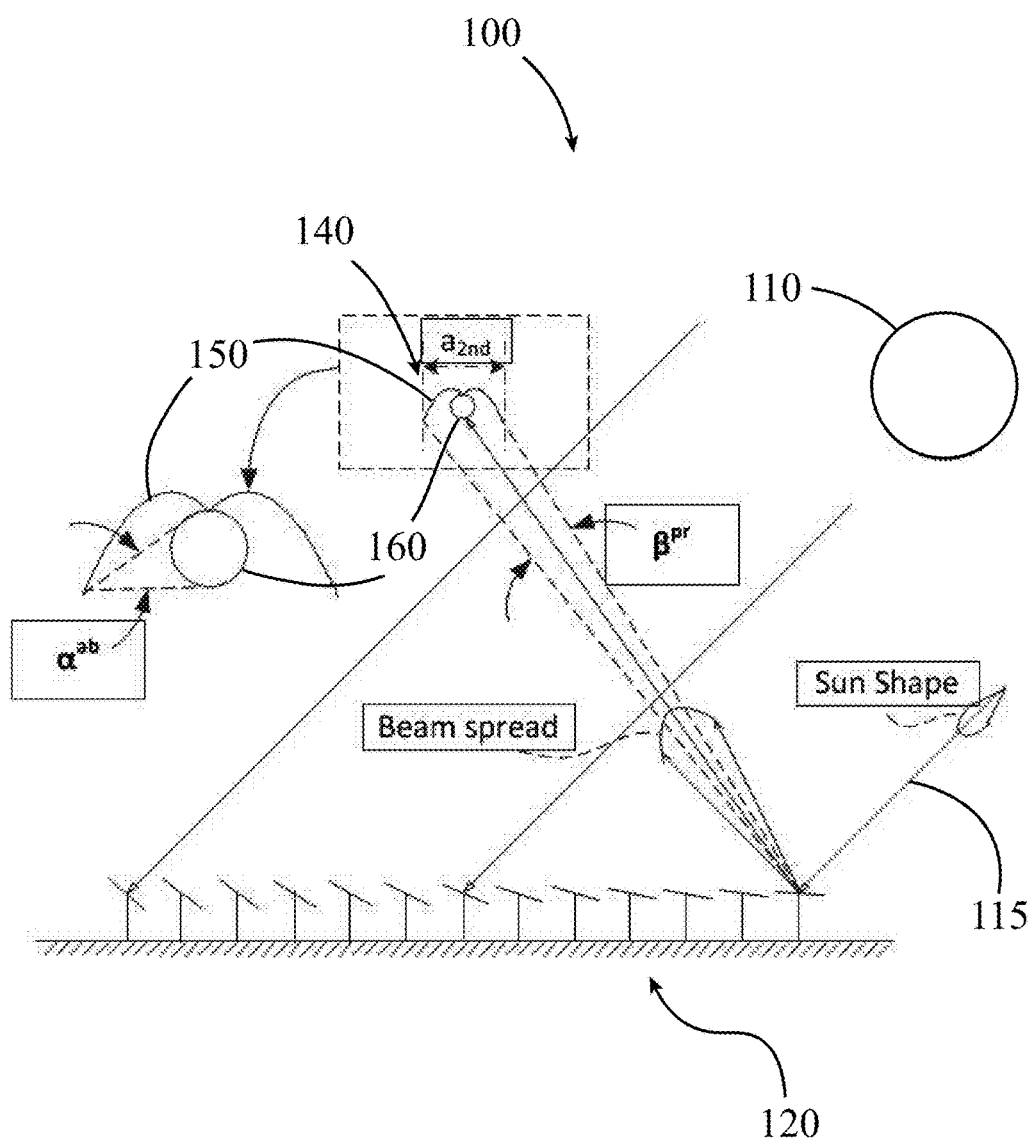
FIG. 12 illustrates various optical features of a CSP plant utilizing Fresnel design features, according to some embodiments of the present disclosure.

An aspect of the present disclosure relates to methods for designing secondary reflectors having characteristics as described above. Referring to FIGS. 11 and 12, a linear Fresnel CSP plant 100 may be characterized by various geometric variables and/or parameters and optical elements. With respect to its geometry, and as described above for FIG. 1, the CSP plant 100 includes an array of primary reflectors 130 and a receiver 140 having an optional secondary reflector 150. The primary reflectors 130 track the light source 110 (e.g. the sun) and reflect the light (e.g. the sun's rays) to the receiver's absorber tube 160, either directly or indirectly angular range of the primary reflector array for Point B is partially obstructed by the absorber tube. By repeating this incidence angular range analysis for the entire surface of the secondary reflector, a central incidence can be readily calculated for each point. The central incidence sun rays for Points A and B are illustrated in the FIG. 13. As used herein, "incidence" is defined as the incoming sun ray direction from the sun with respect to the secondary reflector's aperture.

As shown in the example of FIG. 13, the incidence angular range for the secondary reflector 150 is much wider than the sun shape and the beam spread resulting from the system optical errors is significant. As a result, a secondary reflector having a CPC design may not provide the most efficient solar energy capture, because a CPC secondary reflector is typically designed based on the assumption that the sun light arrives at the CPC secondary reflector's aperture within a tight angle of only a few milliradians. Thus, a non-parabolic reflector shape is needed for secondary reflectors incorporated in linear Fresnel CSP systems utilizing both primary reflectors and secondary reflectors.

To resolve at least this problem and to provide a more efficient CSP plant, some of the methods described herein begin at a pre-specified edge point and adaptively advance it to a complete profile by determining a secondary reflector's receiving/reflecting surface profile that is able to reflect the maximum amount of power/energy to the absorber tube. The resultant final optimum secondary reflector profile depends on features of the specific linear Fresnel system's configuration (e.g. geometry and optics), including parameters such as absorber size, position, collector field size and system optical errors.

Figure 14:
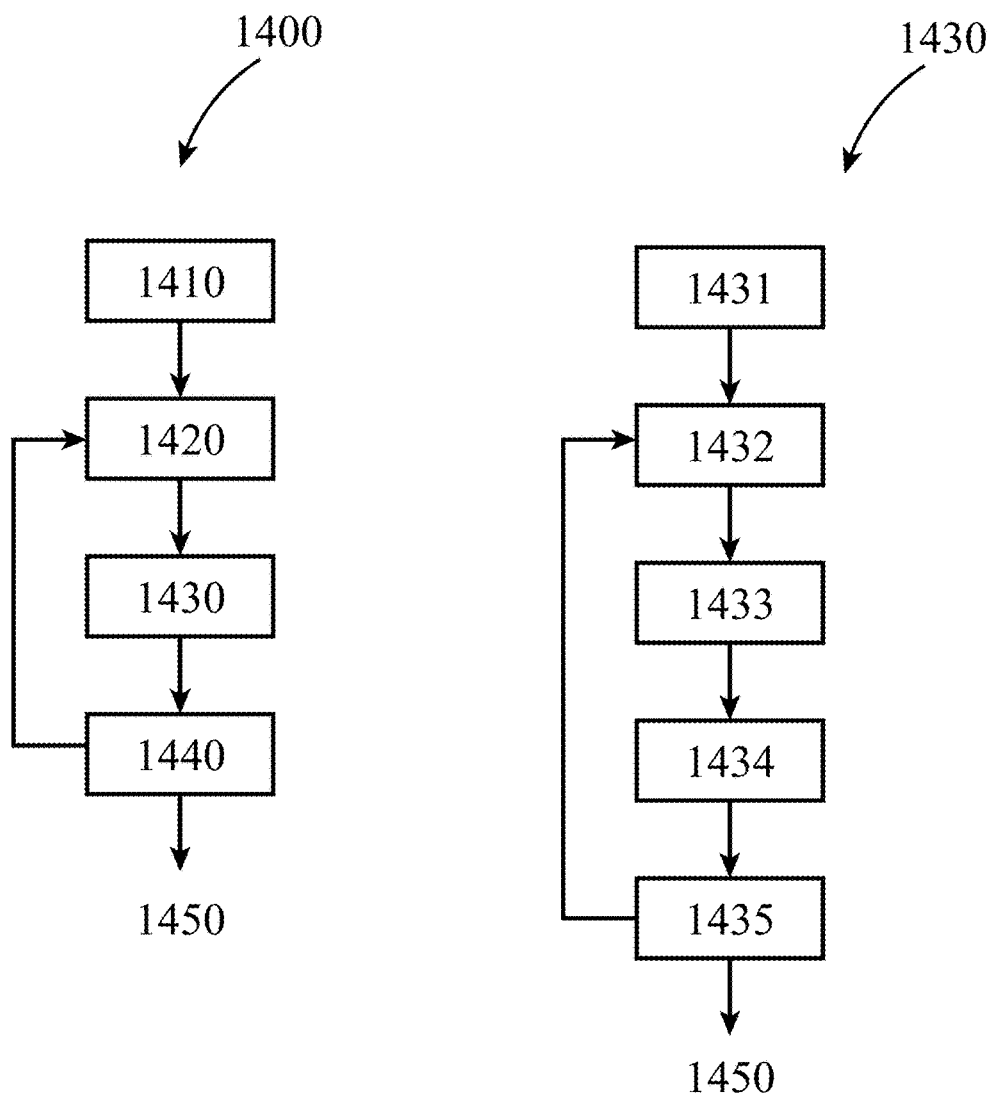
FIG. 14 illustrates flowcharts summarizing method steps for an adaptive method for designing a profile for the receiving/reflecting surface of a secondary reflector, according to some embodiments of the present disclosure.

FIG. 14 illustrates two flowcharts (left and right) that summarize a method 1400 for adaptively designing a profile for the receiving/reflecting surface (profile) of a secondary reflector having features as described above, for a specific Fresnel CSP plant design. However, it should be noted that the method described below can also be applied to other concentrating solar devices including solar thermal collectors or concentrating PV with secondary reflectors/concentrators. In addition, the method described herein can accommodate different configurations of absorbers (e.g. shape, size, number, and/or geometrical arrangement). Details of each step shown in FIG. 14 are illustrated in more detail in subsequent figures and their corresponding text. Generally, the method 1400 includes the four steps illustrated in the flowchart illustrated on the left side of FIG. 14. Such a method 1400 may begin with the defining 1410 of the primary reflector field's geometry and optics, which will vary depending on the specific CSP plant design details. This defining 1410 provides the CSP system variables and/or metrics necessary to proceed with the defining 1420 of the aperture size for the secondary reflector (e.g. width). With the aperture defined, the method 1400 may then continue through a sequential and iterative process for calculating 1430 the profile of the secondary reflector, based on the various variables and parameters obtained from the upstream defining steps (1410 and 1420). Finally, with a first profile designed, the method 1400 may repeat steps 1420 and 1430 by repeating their calculations for optimizing 1440 the secondary reflector's profile as a function of the height of the secondary reflector relative to the primary reflector field, to finally arrive at the proposed secondary reflector design 1450 for the Fresnel CSP power plant being evaluated.

The flowchart on the right side of FIG. 14 summarizes some of the details of the calculating 1430 step of the first flowchart described above, for calculating 1430 the profile of the secondary reflector. The calculating 1430 of the secondary reflector's profile may begin with the defining 1431 of the vertical position of the starting edge point of the secondary reflector's profile relative to the primary reflector field. Once this position is determined, the method 1400 may proceed with the calculating 1432 of the principal incidence of the incoming light relative to this starting point, which in turn, enables the calculating 1433 of various dependent variables (e.g. target reflection direction, surface normal, surface tangent, etc.), which are all described in more detail below. Once the calculating 1433 is completed, the method 1400 has sufficiently defined the system such that the method 1400 may proceed with the calculating 1434 of the position of the next point on the secondary reflector's profile. The calculating 1444 may be achieved by utilizing a predefined step-distance. Steps 1431 through 1434 may then be repeated until the entire profile is calculated for the secondary reflector. Thus, the method 1400 may include a determining step 1435, which evaluates whether the profile has been completed across the entire aperture (e.g. width) of the secondary reflector and whether or not steps 1431 through 1434 need to be repeated. The final outcome is the proposed secondary reflector design 1450 for the Fresnel CSP power plant being evaluated. Each of the steps described generally above, will now be described in more detail Defining the secondary reflector aperture: For a given linear Fresnel design, the secondary reflector aperture is assumed to be capable of intercepting up to 95%, 96%, 97%, 98%, 99%, or up to greater than 99% of the reflected power from the outer-most mirror n. Thus, the acceptance angle for primary reflector 120n may be defined by:

$$\beta_n^{Pr} = 2 \cdot \sigma_{total} \tag{14}$$

The secondary reflector aperture may be defined by:

$$a_{2nd} \approx 2 \cdot l_n \cdot \sin(\beta_n^{Pr}) \tag{15}$$

The underlying assumptions are: 1) the primary reflector has a parabolic shape; 2) the secondary reflector's aperture width is small compared with the absorber height relative to the primary reflector field (in the y-axis direction; see FIG. 1). However, these assumptions are for illustrative purposes and may vary for different linear Fresnel designs.

Calculating the secondary reflector profile: The secondary reflector aperture ($a_{2nd}$) is determined by collector optimization. As an adaptive method, initially the secondary reflector surface may be determined by the aperture width and, in the absence of other mechanical design limitations (e.g. wind load analysis), the starting point may be placed at the same height (in y-axis direction; see FIG. 1) as the absorber tube's center because this results in the maximum absorber acceptance angle (given the same secondary reflector aperture).

Figure 15:
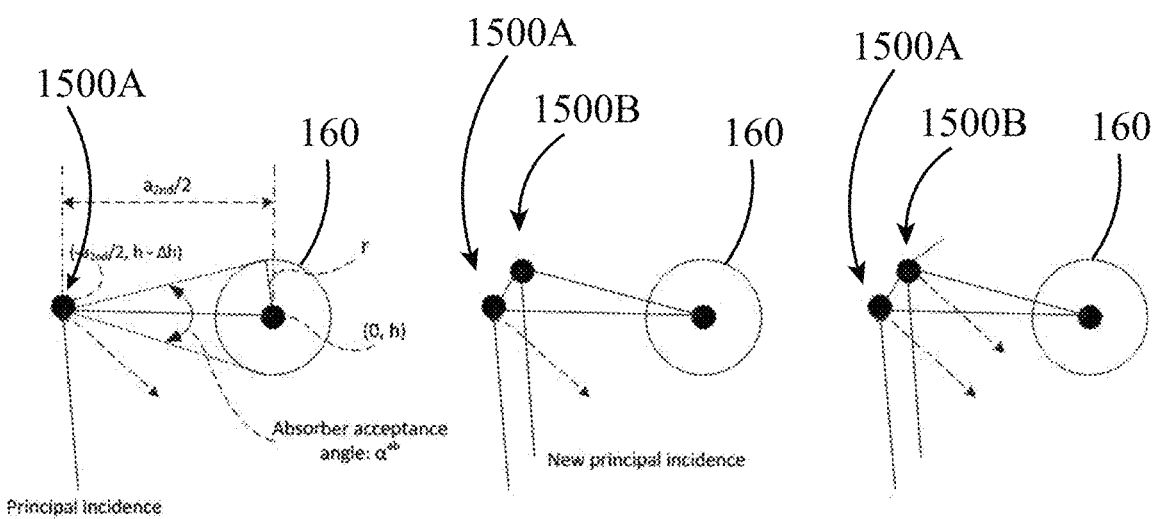
FIG. 15 illustrates some steps for the method illustrated in FIG. 14 for determining the optimal points on the receiving/reflecting surface (or profile) of a secondary reflector, according to some embodiments of the present disclosure.

As illustrated in FIG. 15, initially the principal incidence may be calculated first (see step 1432 in FIG. 14). The principal incidence may be calculated so that the maximum amount of sun ray power is reflected to the absorber tube 160 at a starting point 1500A on the secondary reflector's profile. Strictly speaking, the principal incidence may be determined by performing detailed ray-trace simulation. In a simplified approach, the principal incidence may be defined as the central incidence accounting for the absorber tube blockage (by using the tangent vector to the absorber tube), as illustrated in FIG. 13. As shown in FIG. 14, the method 1400 may proceed with the calculating 1433 of various intermediate variables. The target reflection direction is calculated by connecting the starting point with the absorber tube's center using a straight line. Once the principal incidence and the target reflection direction are identified, the surface normal to the starting point 1500A may be calculated by bisecting the principal incidence and the target reflection. The adaptive method 1400 (see FIG. 14) continues by calculating 1434 the next point 1500B along the secondary reflector's surface (or profile). This point may be determined by specifying a step distance (depending on the surface accuracy requirement) along the secondary reflector's surface tangent vector. Then the principal incidence, the reflection, the surface normal, and the surface tangent at the second surface point 1500B may be determined by repeating the process for the next point (not shown) on the secondary reflector's surface/profile. An optional iterative process may be utilized to further refine the point (1500B) determined above (by specifying a step distance) by calculating the angle between the surface normal at the first two surface points (1500A and 1500B) and adjusting the surface tangent by half of the calculated angle so that the angular difference between the surface normal and the surface tangent are the same for the two neighboring surface points (1500A and 1500B).

The process described above is then repeated for as many subsequent surface points as necessary to determine the remaining surface, resulting in a complete reflector shape (see FIG. 14). FIG. 16 illustrates an example of a profile 410 for a secondary reflector, including a first half of the profile 410A and a second half of the profile 410B, using the adaptive method described above. FIG. 16 illustrates how a secondary reflector 150 may be configured to focus the light 115 received from the primary reflectors (not shown) onto a focal point 1600 (e.g. the center point of the circular cross-section of the absorbing tube 160).

Figure 17:
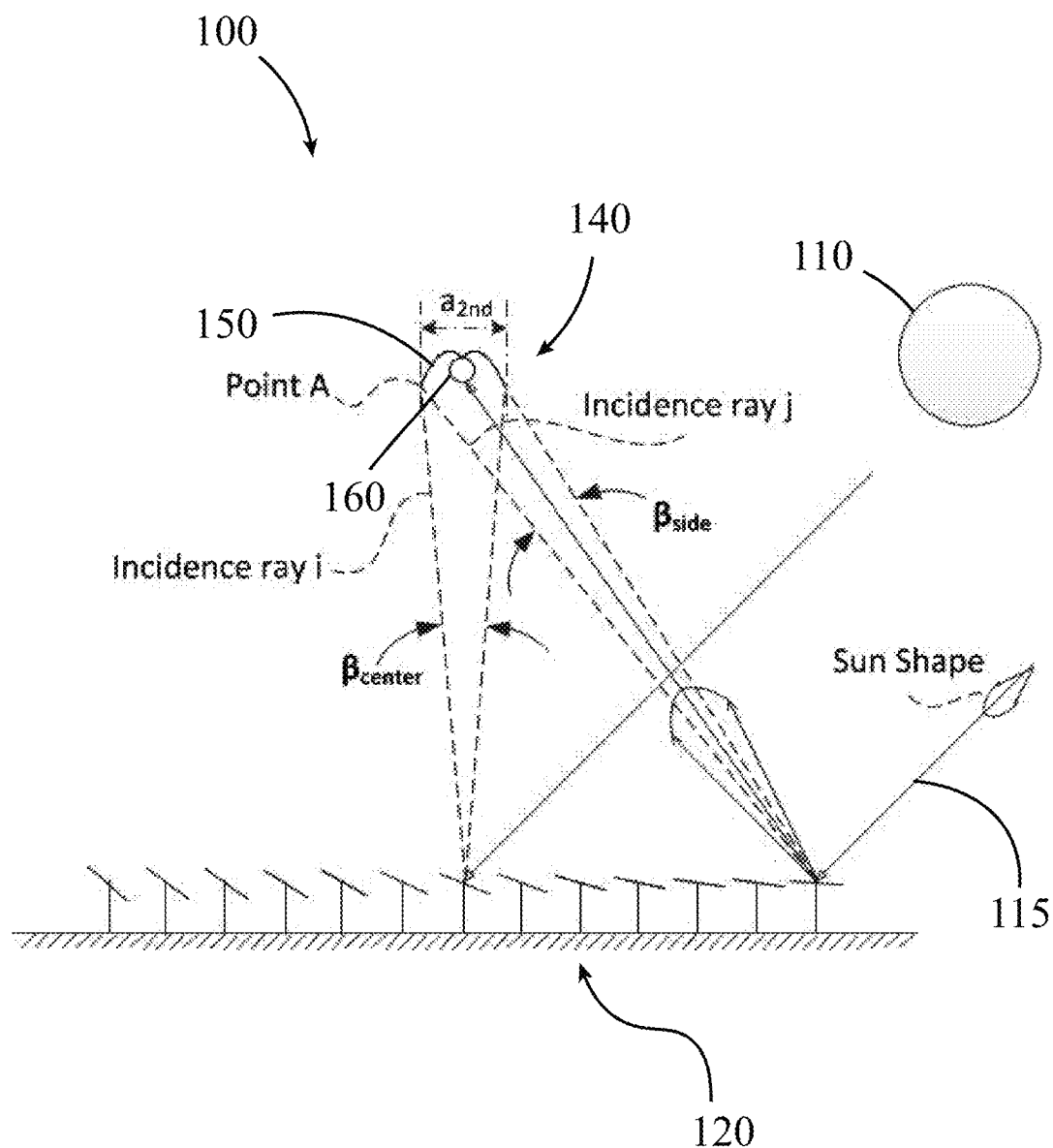
FIG. 17 illustrates how the acceptance angle of a secondary reflector aperture changes with primary reflector position, according to some embodiments of the present disclosure.

Calculating the principal incidence using the accumulated power intensity: The principal incidence direction for any point on the optimum secondary reflector surface may be determined so that the maximum amount of power will be reflected to the absorber tube. The acceptance angle of the absorber tube $a^{ab}$ is typically much less than the incidence angular range for a point on the surface of the secondary reflector. Thus, the central incidence may not be a good approximate for the principal incidence. Thus, as described herein, some embodiments of the present disclosure may use a more accurate but simpler approach for calculating the principal incidence at any point on the surface of the secondary reflector. First, as illustrated in FIG. 17, the acceptance angle of the primary reflector may be smaller for the primary reflectors located closer to the primary reflector field's center than those of primary reflectors located farther away, which may be considered the deviation angel of Point A from the primary reflector tracking direction. Referring again to FIG. 15, it can be seen that, $$\beta_{center} < \beta_{side} \tag{16}$$

Figure 18:
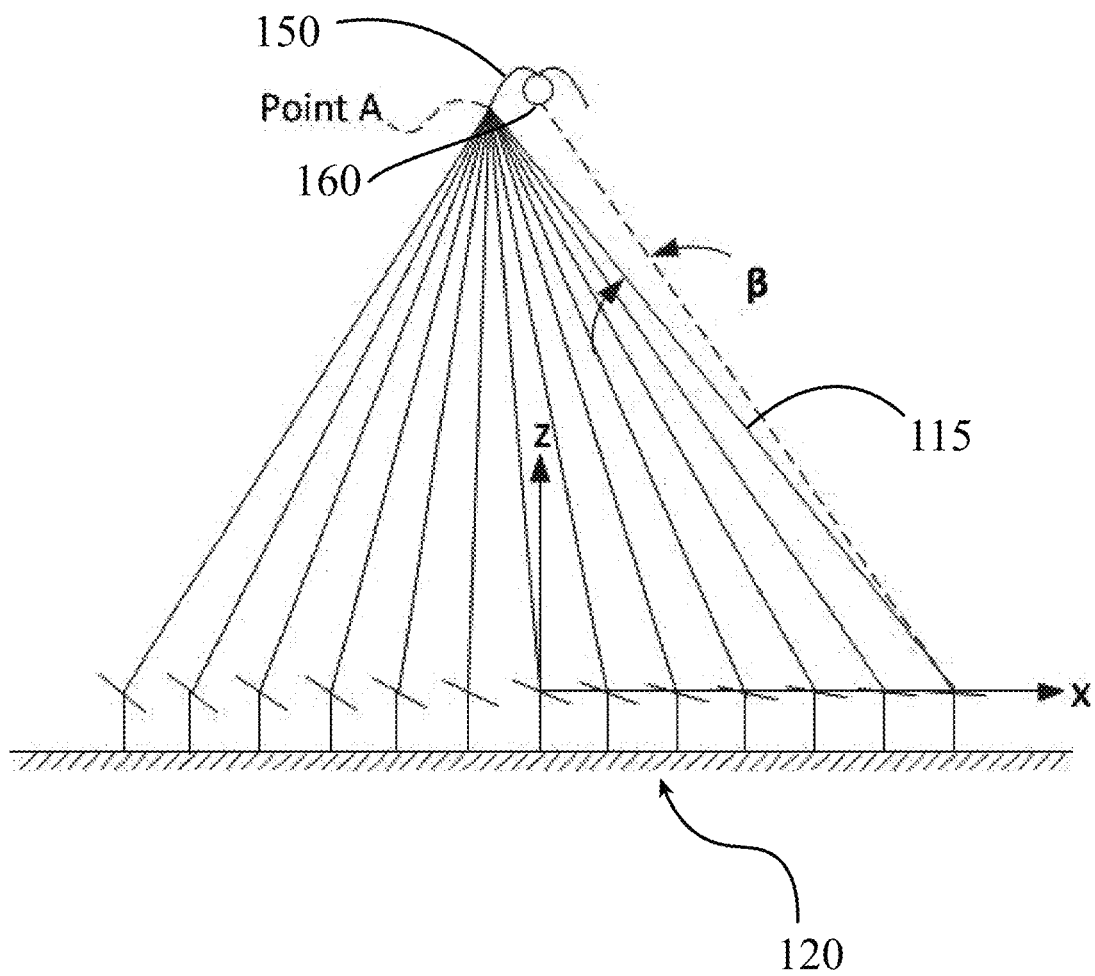
FIG. 18 illustrates how the power intensity changes at Point A with primary reflector position because the relative deviation from the nominal tracking direction changes for each primary reflector, according to some embodiments of the present disclosure.

This implies that the power intensity for incidence ray i is more than the power intensity for incidence ray j. Thus, for the point A on the secondary reflector's surface, the power intensity varies with the position of the primary reflector. As shown in FIG. 18, power intensity decreases from the left outer-most primary reflector to the center primary reflector and then increases toward the right outer-most primary reflector. More specifically, the power intensity of each ray is a function of the deviation angle, which is a function of primary reflector position. Assuming the reflected beam spread follows a Gaussian distribution, the power intensity may be obtained:

$$P(x) = g(\sigma_{total}, \beta^{pr}(x)) \tag{17}$$

where g is a Gaussian function with a standard deviation of total and defines the intensity at a deviation angle of $\beta^{pr}(x)$. As illustrated in FIG. 18, $\beta^{pr}(x)$ may be calculated as a function of the primary reflector position.

Figure 19:
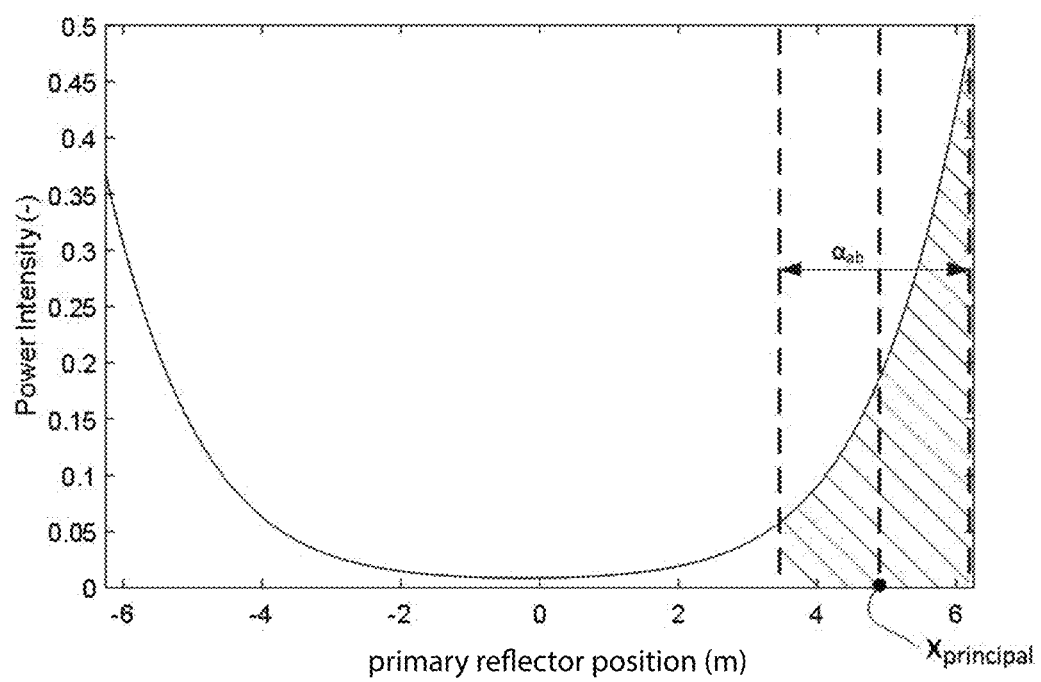
FIG. 19 illustrates a step for determining the principal incidence point using the receiver acceptance angle, according to some embodiments of the present disclosure.

FIG. 19 illustrates the distribution of the power intensity of the incidence rays as a function of mirror position. As expected, the power intensity may decrease first and then increase with increasing distance to the mirror array center. However, the power intensity for mirrors located on the right side of FIG. 19 is higher than the power intensity of mirrors located on the left side because the elongated optical path to the mirrors located on the right leads to a smaller deviation angle and thus higher power intensity. As illustrated in FIG. 19, an absorber acceptance window may be formed using two vertical lines. The mirror distance between two vertical lines corresponds to the absorber acceptance angular size for point A. The acceptance window moves from left to right and the accumulated power intensity is calculated for this acceptance window as a function of mirror position. At the principal mirror position, the acceptance window has the maximum accumulated power intensity. If the absorber is large enough, the acceptance angle window will be larger than the entire mirror array and the central incidence would be equal to the principal incidence.

Figure 20:
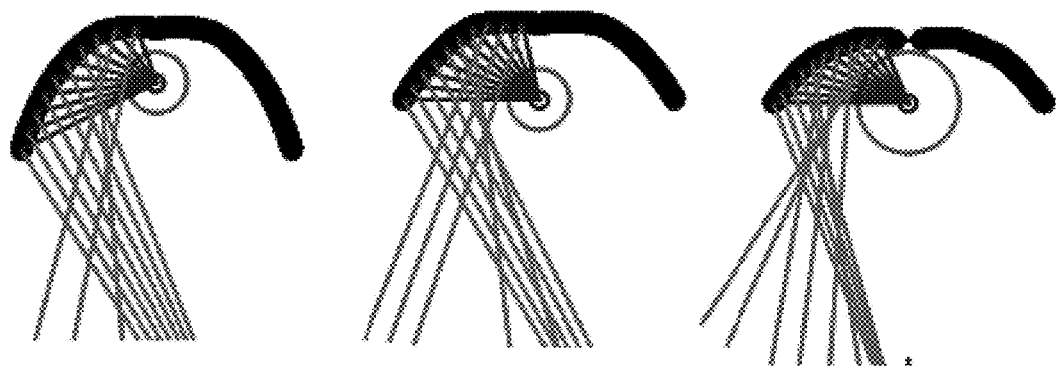
FIG. 20 illustrates the profiles of receiving/reflecting surfaces of secondary reflectors resulting from the methods described herein for varying receiver heights and receiver sizes, according to some embodiments of the present disclosure.

This process may be repeated for any other points on the surface of the secondary reflector. The view blockage of the absorber tube may be accounted for geometrically. FIG. 20 provides three examples of optimized surface shapes (profiles) for secondary reflectors, as a function of the relative height of the secondary reflector and absorber tube size. For all cases, starting from the left edge point on the surface of the secondary reflector, the principal incidence comes from the opposite side of primary reflectors first (e.g. referring to FIG. 16 starting at the left side of the surface for the secondary reflector, the principal incidence comes from primary reflectors located on the right side), and then shifts to the primary reflectors located on the same side because of the absorber tube blockage. For the profile shown on the right side of FIG. 20, the central flat part of the profile is the result of a minimum distance set between the absorber tube and the secondary reflector because of the existence of a glass envelope for situations where a vacuum absorber tuber is utilized.

Optimizing the secondary reflector height: When the vertical position of the starting edge point on the surface of the secondary reflector is not fully determined, the relative height of the secondary reflector may not be determined. A practical criterion to determine the optimum secondary reflector height is the average distance between the surface of the secondary reflector and absorber tube. The shorter the average distance, the larger the average absorber tube acceptance angle, which results in more energy intercepted by the absorber tube from reflected light from the secondary reflector.

Example: Optimization of a secondary reflector profile for the Hyperlight Energy linear Fresnel technology. The geometrical attributes of such a system are summarized in Tables 2 and 3 below.

TABLE 2

| Geometrical specifications of the Hyperlight Energy reflector assembly. | |
|---|---|
| Total collector width | 12.8 |
| Total collector effective width ($W_{field}$, m) Measured from secondary reflector edges at the two ends | 12.5 |
| Net secondary reflector aperture width ($W_{primary}$, m) | 10.5 |
| No. of basin along width | 2 |
| Basin width (m) | 6.1 |
| Basin length (m) | 15.7 |
| Basin spacing along width (m) | 1.0 |
| Basin spacing along length (m) | 0.67 |
| No. of primary reflectors per basin | 50 |
| Primary reflector width (m) | 0.105 |
| Primary reflector spacing (m) | 0.115 |
| Position of inner most primary reflector relative to the inner edge of secondary refelctor(m) | 0.15 |

TABLE 2-continued

Geometrical specifications of the Hyperlight Energy reflector assembly.

| | |
|---|---|
| Position of outer most reflector relative to the inner edge (m) Receiver assembly | 5.9 |
| Absorber tube height (m) | 7 |
| Absorber tube diameter (m) | 0.09 |

TABLE 3

Optical properties of the Hyperlight Energy reflector assembly.

| Primary reflector | |
|---|---|
| Reflectance of primary reflector | 0.94 |
| RMS of specularity (Gaussian, mrad) | 1.5 |
| RMS of slope error and tracking error(Gaussian, mrad) | 3 |
| Absorber tube | |
| Transmittance of glass envelope | 0.97 |
| Absorptance of surface coating | 0.96 |
| Position error (vertical, m) | [0, 30] |
| Secondary reflector | |
| Reflectance of primary reflector | 0.94 |
| Specularity (Gaussian, mrad) | 1.5 |
| Slope error (Gaussian, mrad) | 2 |
| Position error(vertical, m) | [0, 20] |

Defining the secondary reflector aperture for the Hyperlight system: It was assumed that the secondary reflector aperture needs to capture a certain amount of reflected solar power from the outer-most reflector. By using the beam spread RMS estimation of Equation (13) and ignoring receiver position error, the total reflector beam RMS may be obtained by, $$\sigma_{total-reflector}^2 = \sigma_{sun}^2 + \sigma_{specularity}^2 + 4 \times \sigma_{slope+track}^2 = 2.8^2 + 1.5^2 + 4 \times 3.0^2 \quad (18)$$

In this example, the sun shape was assumed to have a circumsolar ratio (CSR) of 10%, which has a RMS of about 2.8 mrad; the mirror specularity, slope error and tracking error are listed in Table 3 above. $\sigma_{total-reflector}$ is the RMS of the beam spread after accounting for all reflector errors. It was assumed that the beam spread after secondary reflector reflection follows a Gaussian distribution. Thus, the required acceptance angle to capture 95% of reflected power under normal incidence may be defined as:

$$\beta_n^{pr} = 2 \times \sigma_{total-reflector} = 13.6 \text{mrad} \quad (19)$$

where $\beta_n^{pr}$ is illustrated in FIG. 12.

The required secondary reflector aperture to capture 95% of reflected power at the outer edge of the outmost primary reflector at the normal incidence may be determined by, $$\frac{a_{2nd}}{2} \cong l_n \cdot \sin(\beta_n^{pr}) + \frac{w_n}{2} \cdot \cos(\tau_n) = \sqrt{\left[7^2 + \left(\frac{12.5}{2} - \frac{0.105}{2}\right)^2\right]} \times \sin(0.0136) + \frac{0.105}{2} \times \cos(0.36) \cong 0.176 \text{ m} \quad (20)$$

where $l_n$ is the distance between the n-th primary reflector center and the absorber tube center; $w_n$ is the n-th primary reflector width; $\tau_n$ is the tracking angle of the n-th primary reflector. The addition of the second term in Equation 20 is the result of a flat primary reflector. Thus, $$a_{2nd} \cong 0.35 \text{ m} \quad (21)$$

Selection of the absorber tube: The geometric concentration ratio of a linear Fresnel collector may be defined by, $$C = \frac{W_{primary}}{D_{absorber}} \quad (22)$$

The higher the concentration, the less the absorber tube surface area per primary reflector area, which leads to less heat loss and increases the system thermal efficiency. With such a high concentration ratio, the secondary reflector may attain relatively high temperatures resulting in limited secondary reflector design options and increased costs. In this example, a vacuum absorber was selected. For vacuum absorbers in the market, the largest available absorber tube diameters for parabolic trough collectors is about 0.09 m. Due to the elongated optical path for a linear Fresnel system compared to a parabolic trough, a vacuum absorber tube diameter of 0.09 m was selected. As a result, the geometric concentration ratio was determined to be about 117 for the Hyperlight example described herein.

Figure 21:
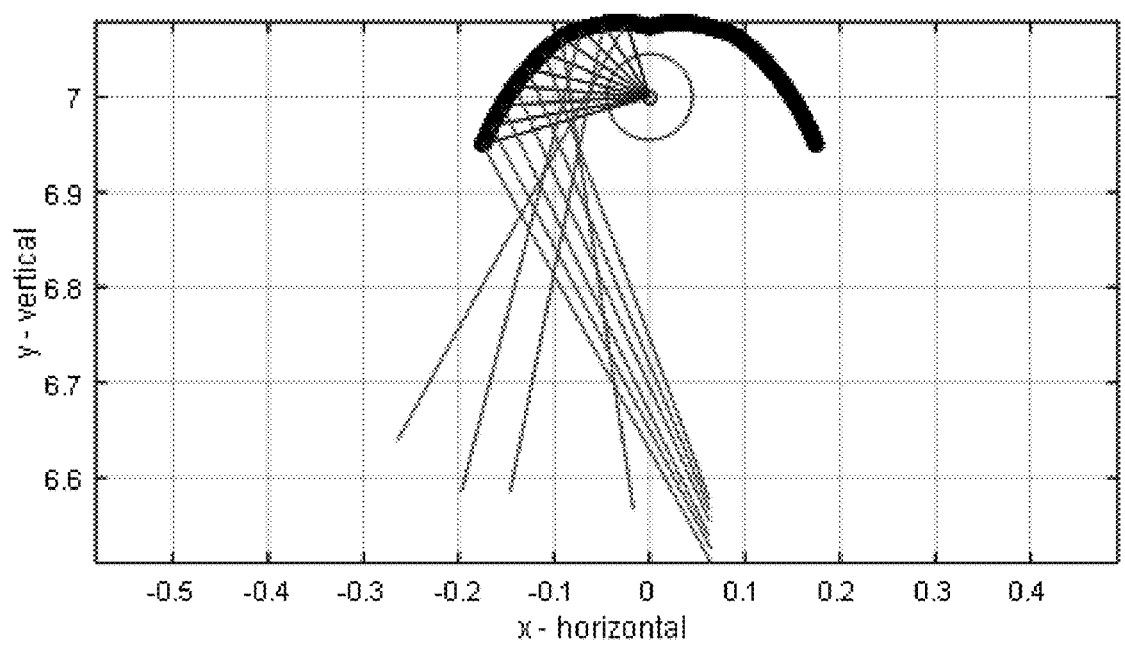
FIG. 21 illustrates an example of a secondary reflector profile calculated by the method described herein and summarized in FIG. 14, according to some embodiments of the present disclosure, designed specifically for the Hyperlight Energy primary reflector field.

Calculating the secondary reflector profile: The method described above and summarized in FIG. 14 was then used to design a proposed secondary reflector profile for the Hyperlight Energy collector configuration, as described above. The resultant optimum vertical position of the edge point on the surface of the secondary reflector was determined to be about 0.05 m lower than the absorber center, as shown in FIG. 21.

The performance of a proposed secondary reflector can be characterized by the following metric, the secondary intercept factor:

$$\gamma_{2nd}(\theta_\perp, \theta_\parallel) = \frac{\text{Power intercepted by absorber}}{\text{Power intercepted by secondary}} \quad (23)$$

reflector aperture $\cong \gamma_{2nd}^t(\theta_\perp) \cdot \gamma_{2nd}^l(\theta_\parallel)$ For a selected absorber tube, the higher the intercept factor, the better the efficiency of the secondary reflector performance. Here, $\theta_\perp$ and $\theta_\parallel$ are the transversal angle and longitudinal incidence angle, respectively. The secondary intercept factor may be decomposed as two individual secondary intercept factors ($\gamma_{2nd}^t$ and $\gamma_{2nd}^l$) along transversal and longitudinal directions for mathematical simplification.

Figure 22:
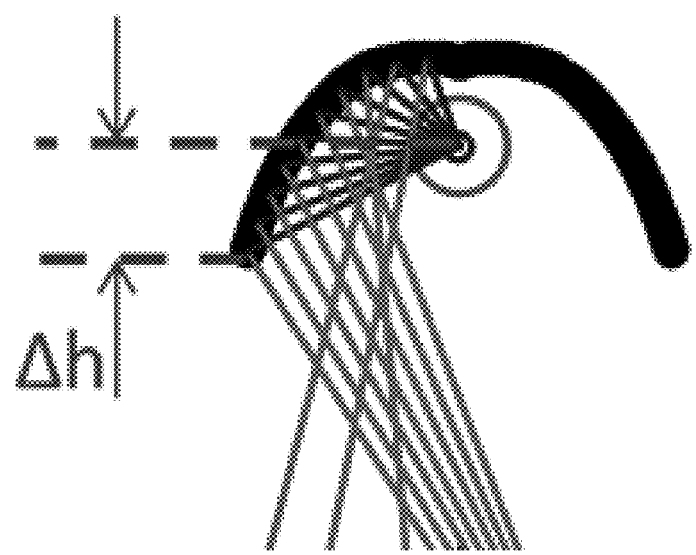
FIG. 22 illustrates what is referred to herein as the relative edge height ($\Delta h$), a design parameter, for designing the profile for a secondary reflector, according to some embodiments of the present disclosure.
Figure 23:
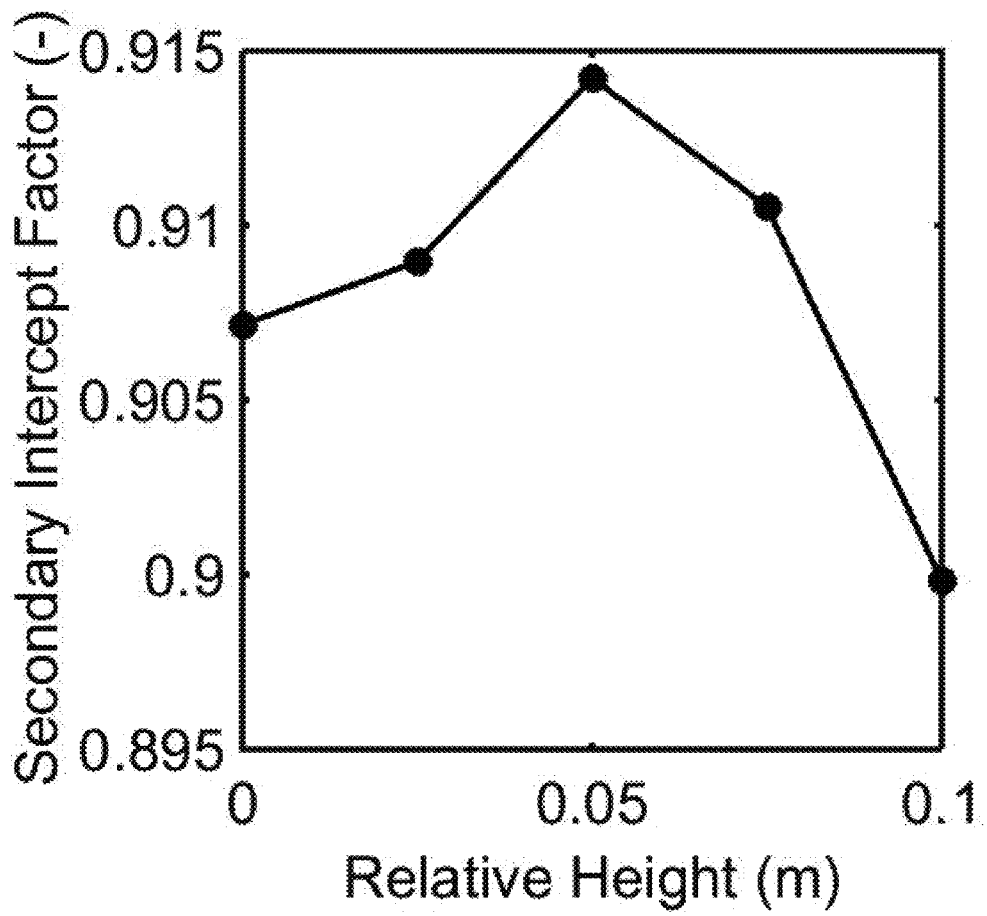
FIG. 23 illustrates the secondary intercept factor of secondary reflector profiles as a function of relative edge height, according to some embodiments of the present disclosure.
Figure 24:
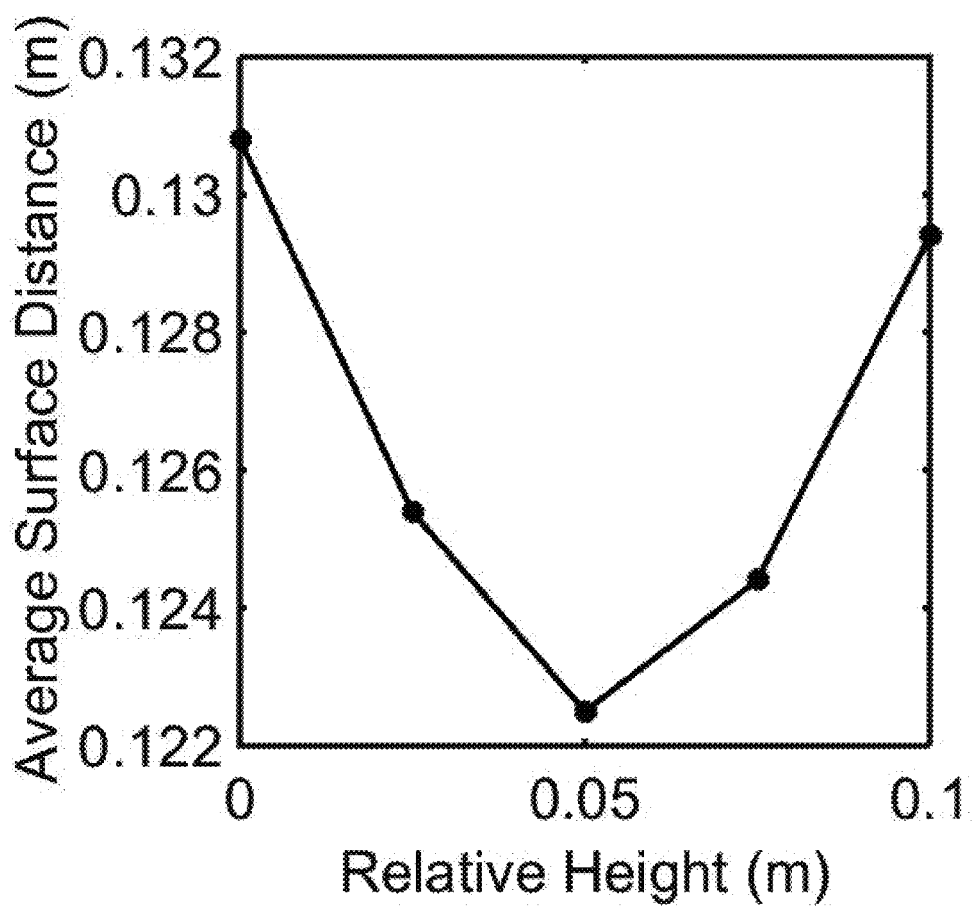
FIG. 24 illustrates the average surface distance of secondary reflector profiles to absorber centers as a function of relative edge height, according to some embodiments of the present disclosure.

For the Hyperlight Energy collector configuration, the absorber tube position may be fixed at 7 meters and the secondary reflector may have one additional design parameter—the relative edge height, which is defined as the relative vertical distance between the absorber tube center and the secondary edge point, as shown in FIG. 22. To calculate the impact of the relative edge height to the secondary intercept factor, a ray-trace software—SolTrace—was employed to perform optical simulation of the Hyperlight Energy collector. SolTrace is a software tool that the National Renewable Energy Laboratory (NREL) has developed to model and analyze the optical performance of CSP collectors. It uses the Monte-Carlo algorithm to simulate the sun shape and can efficiently account for effects of various system optical errors. A SolTrace model was developed to accommodate the Hyperlight Energy collector configuration (geometry and optics) and simulate the optical performance of derived secondary-reflector profiles. FIG. 23 shows the secondary intercept factor at normal incidence with varying relative edge height of secondary reflectors. It can be seen that the secondary intercept factor becomes highest at the relative edge height of 0.05 m, but the secondary intercept factor is higher than 90% in most cases. To understand the rationale behind this fact, the average surface distance to the absorber tube center is also plotted as a function of relative edge height (see FIG. 24). The maximum secondary intercept factor corresponds to the minimum average distance. The shorter the average distance, the larger the absorber tube acceptance angle to the secondary reflector.

Figure 25:
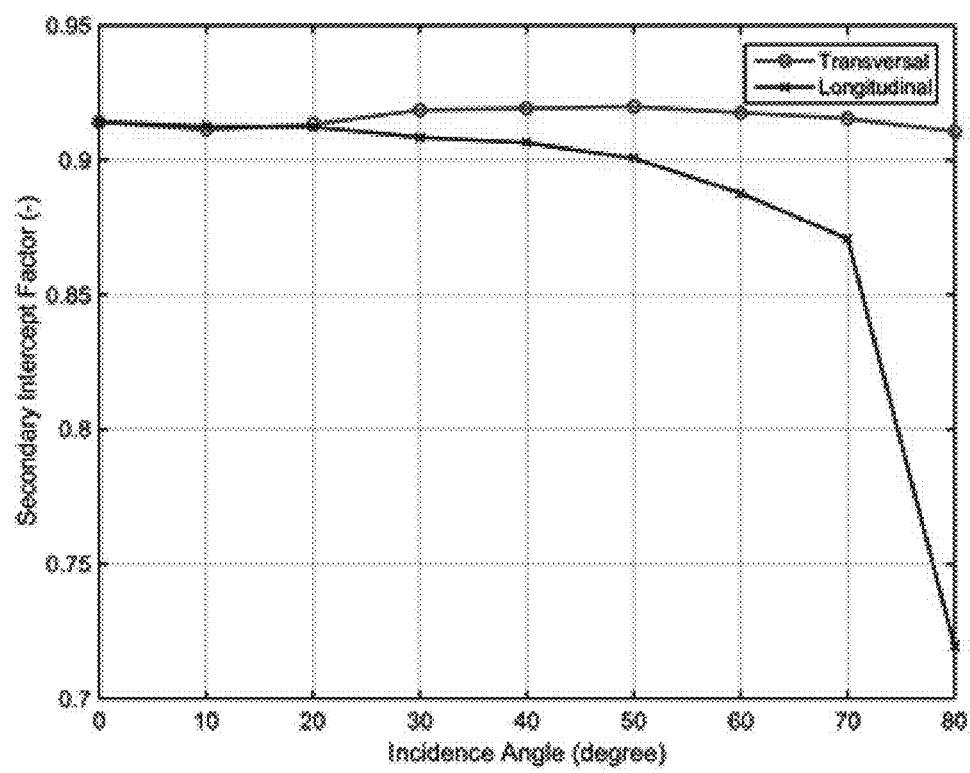
FIG. 25 illustrates the secondary intercept factor as a function of incidence angle to characterize the performance of a secondary reflector profile, according to some embodiments of the present disclosure. A secondary-reflector reflectance equal to 0.94 is assumed in the ray-trace simulations.

After the relative edge height was optimized, the final secondary reflector profile was determined as well. Its secondary intercept factor at different sun positions was then calculated using Soltrace. As shown in FIG. 25, the secondary intercept factor of the optimal secondary-reflector profile was plotted as a function of both transversal and longitudinal incidence angles. Note that the secondary reflector reflectance was assumed to be 0.94. From the plot, the secondary intercept factor stayed between 0.91 and 0.92 for the entire range of transversal incidence; and with the increasing longitudinal incidence angle, the secondary intercept factor only started to drop significantly at incidence angles higher than 70°. It is evident that the derived secondary reflector profile is able to remain at a consistently high performance level for the majority of sun positions during a calendar year and exhibit its design robustness with varying incidence angles.

Projected collector performance: The collector optical efficiency can be defined as:

$$\eta(\theta) = \rho \cdot \tau \cdot \alpha \cdot \gamma_{1st}(\theta_\perp, \theta_\parallel) \cdot \gamma_{2nd}(\theta_\perp, \theta_\parallel) = \quad (24)$$
$$\eta_o \cdot IAM(\theta_\perp, \theta_\parallel) \cong \eta_o \cdot IAM^t(\theta_\perp) \cdot IAM^l(\theta_\parallel)$$

Here, $\rho$ is the primary mirror reflectance, $\tau$ is the absorber tube glass-envelope transmittance, and $\alpha$ is the average absorber tube coating absorptance. $\eta_o$ is the nominal optical efficiency and IAM is the incidence angle modifier, which can be approximated by decomposing IAM into two incidence angle modifiers ($IAM^t$ and $IAM^l$) along transversal and longitudinal directions. $\gamma_{1st}$ is the primary intercept factor accounting for the cosine loss, shading and blocking effect, and intercept accuracy of primary reflector array with respect to the secondary-reflector aperture:

$$\gamma_{1st}(\theta_\perp, \theta_\parallel) = \frac{\text{Power intercepted by secondary reflector aperture}}{\text{Power intercepted by the entire primary reflector aperture}} \quad (25)$$

Figure 26:
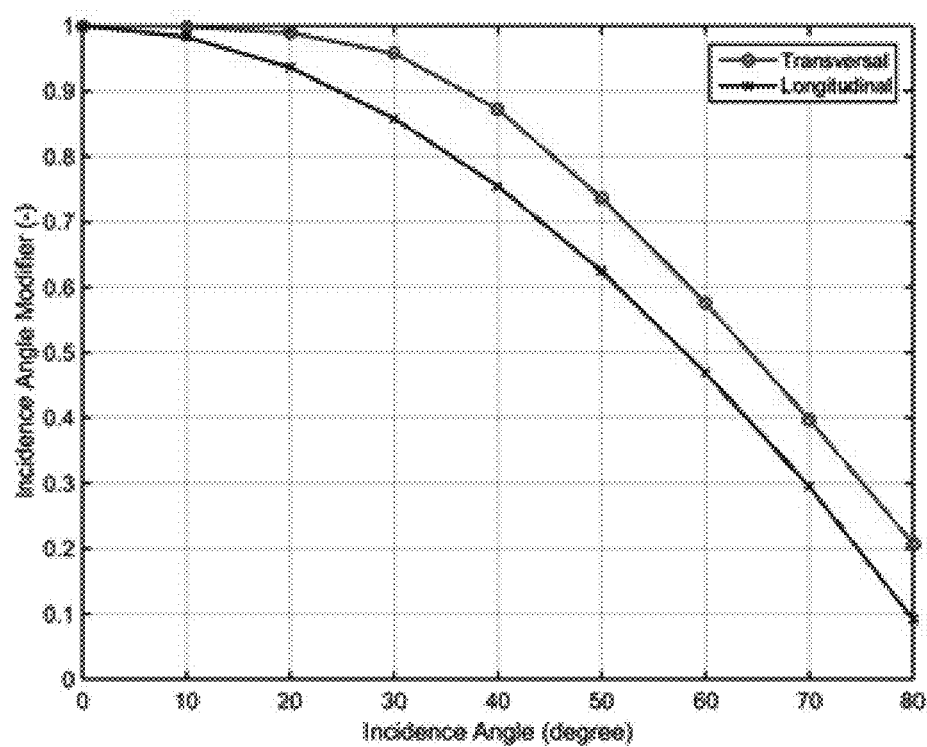
FIG. 26 illustrates the incidence angle modifier as a function of incidence angle for the Hyperlight Energy primary reflector field example and the resultant secondary reflector as designed using the method described herein, according to some embodiments of the present disclosure. The nominal optical efficiency is calculated as 0.699.

By employing SolTrace, the optical performance of the Hyperlight Energy primary reflector field with the optimal secondary profile was calculated. The resultant incidence angle modifiers are plotted in FIG. 26. The nominal optical efficiency at normal incidence is 0.699 from the SolTrace simulations.

The optical loss of a linear Fresnel collector comes from four sources: (a) Loss due to component optical properties. This is the effect of primary reflector reflectance, absorber tube absorptance, and absorber-envelope transmittance; (b) Secondary reflector intercept loss. This accounts for the secondary reflector reflectance and the fact that some reflected light by the secondary reflector will miss the absorber tube; (c) Primary intercept loss excluding cosine loss. This accounts for shading and blocking of primary reflector field and the fact that some reflected light by the primary reflector will miss the secondary reflector aperture; and (d) Primary intercept loss—cosine loss. This accounts for the cosine loss of the primary reflector field.

Figure 27:
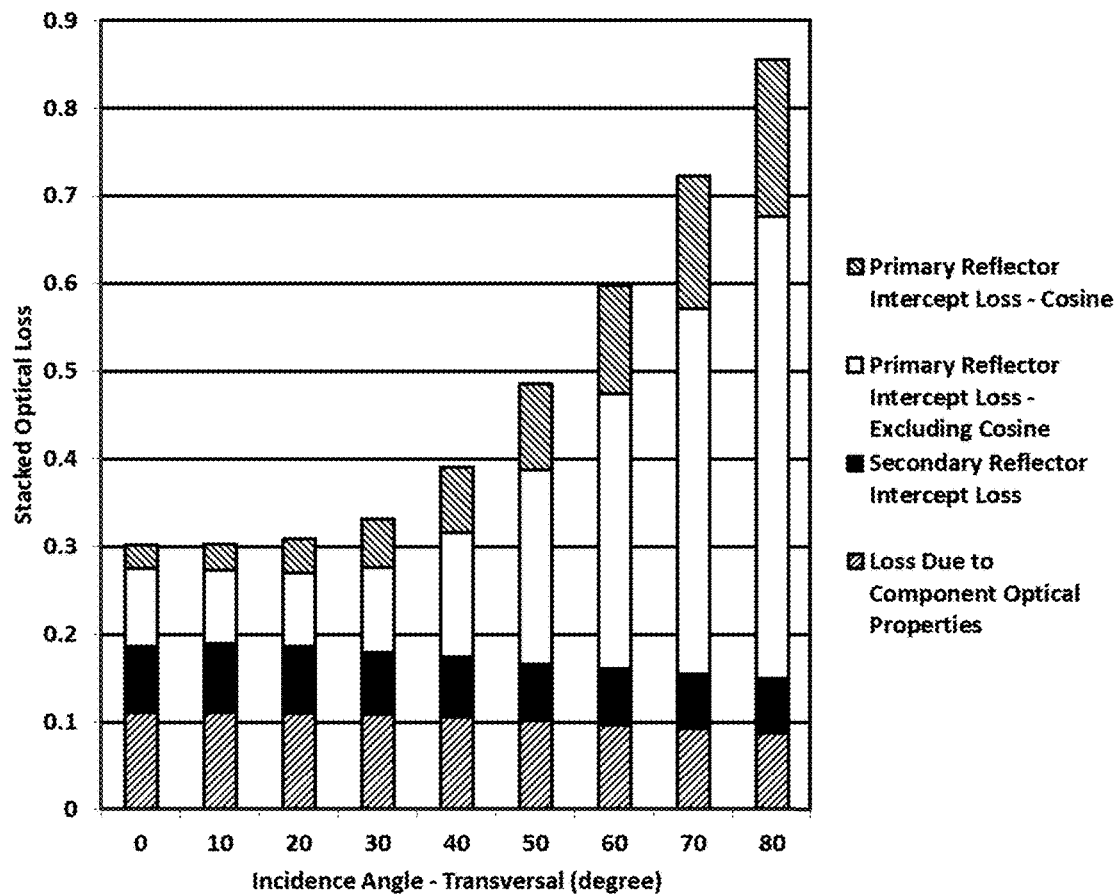
FIG. 27 illustrates stacked optical losses based on individual error sources for varying incidence angle (transversal), according to some embodiments of the present disclosure.
Figure 28:
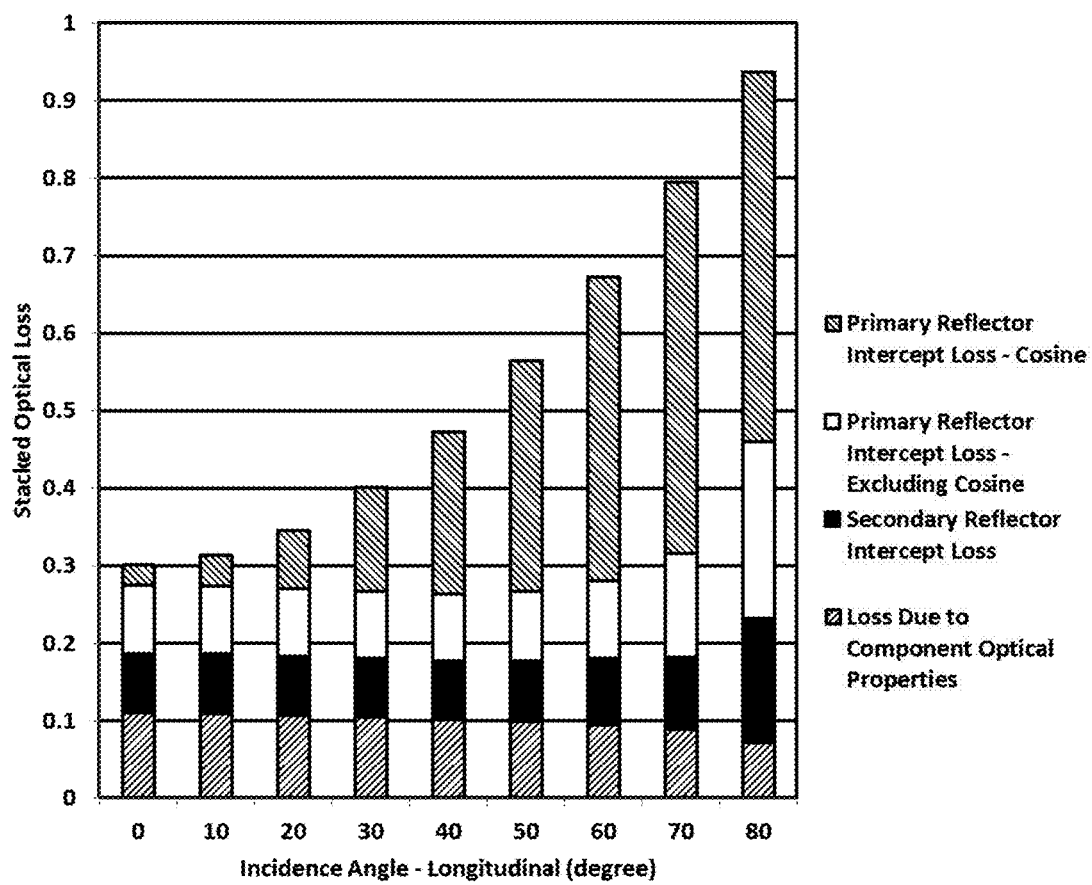
FIG. 28 illustrates stacked optical losses based on individual error sources for varying incidence angle (longitudinal), according to some embodiments of the present disclosure.

The relative contribution of each individual optical loss source is plotted for varying transversal and longitudinal incidence angles in FIGS. 27 and 28, respectively. For an increase in both incidence angles, the optical loss due to component optical properties and secondary intercept loss remain roughly constant and this again illustrates the robustness of the secondary reflector surface design (e.g. profile). The cosine loss of the primary reflectors increases with increasing transversal or longitudinal incidence angle, but this is due to the nature of the linear Fresnel configuration and cannot be significantly reduced any further. The primary reflector intercept loss, excluding cosine loss, has a substantial contribution to the collector performance as shown in the FIGS. 27 and 28. Particularly for the increasing transversal incidence angle, the portion of optical loss starts to dominate the overall collector optical loss. This portion of primary intercept loss comes primarily from shading and blocking and largely depends on the collector geometrical configuration such as primary reflector spacing and the receiver height. With increasing primary spacing, the shading and blocking will decrease, but more reflected sun rays will miss the receiver due to the increasing optical path. This indicates that there exists an optimal primary spacing and a receiver height that will produce the highest collector performance. At the same time, the determination of a set of optimal collector geometrical parameters will also require accounting for associated economics of the overall linear Fresnel collector system depending on specific applications. The stacked bar plots with different optical-loss sources will shed light on future collector optimization.

Figure 29A:
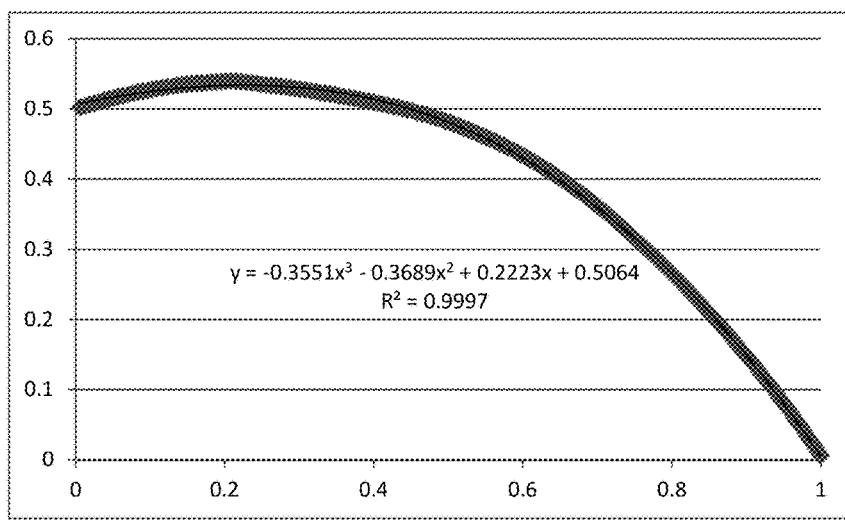
FIGS. 29A through 29D illustrate profiles for secondary reflectors obtained using methods described herein, according to some embodiments of the present disclosure.
Figure 29A:
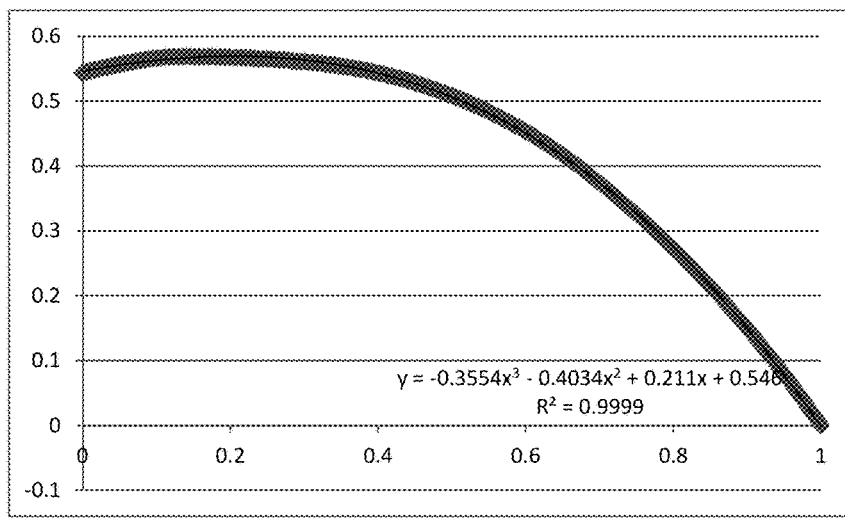
Figure 29A:
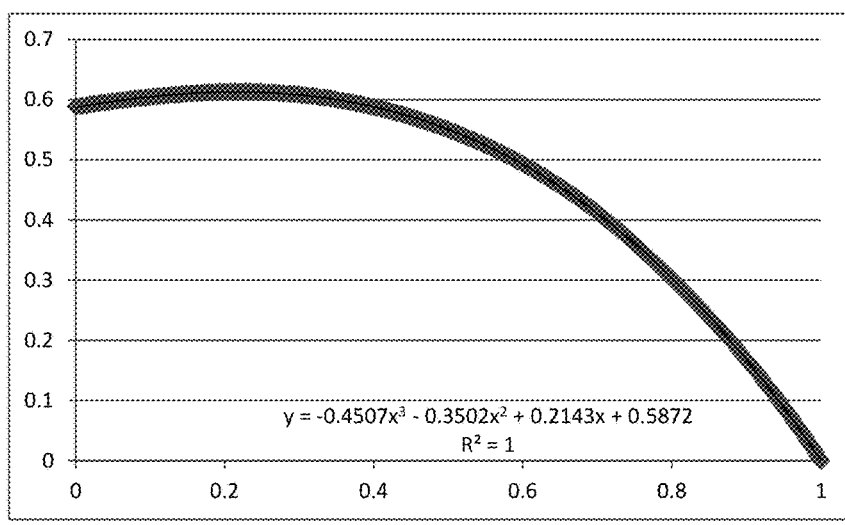
Figure 29B:
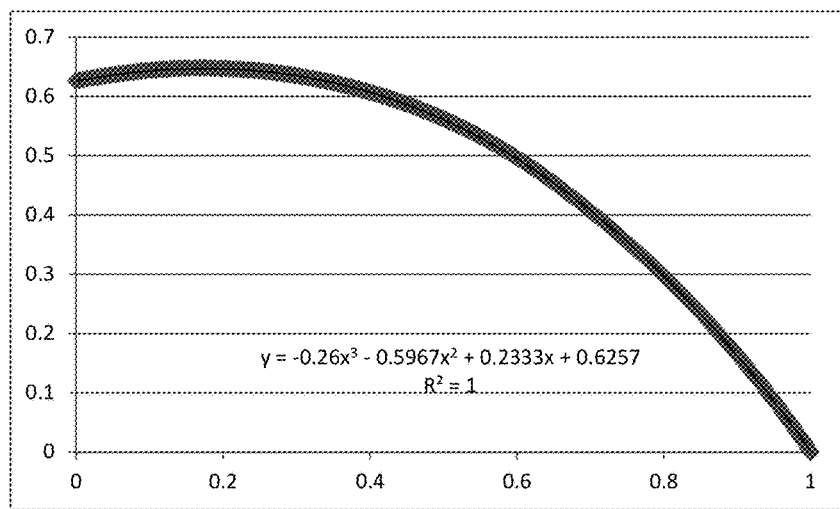
Figure 29B:
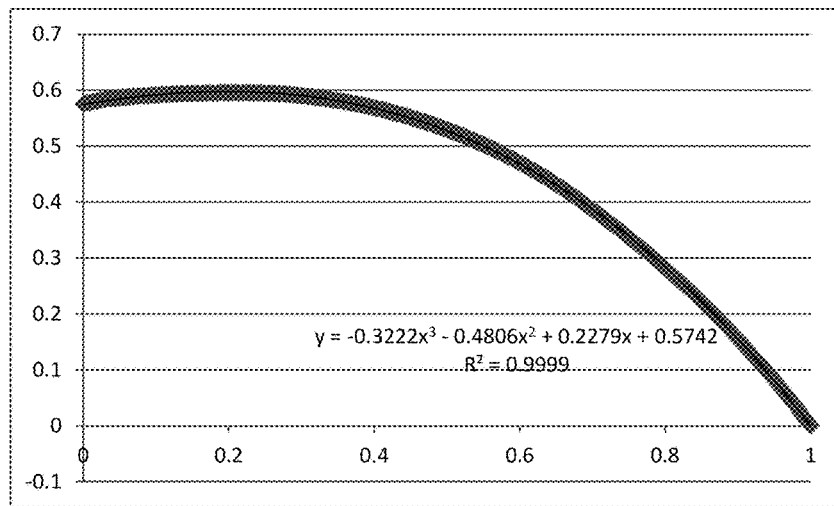
Figure 29B:
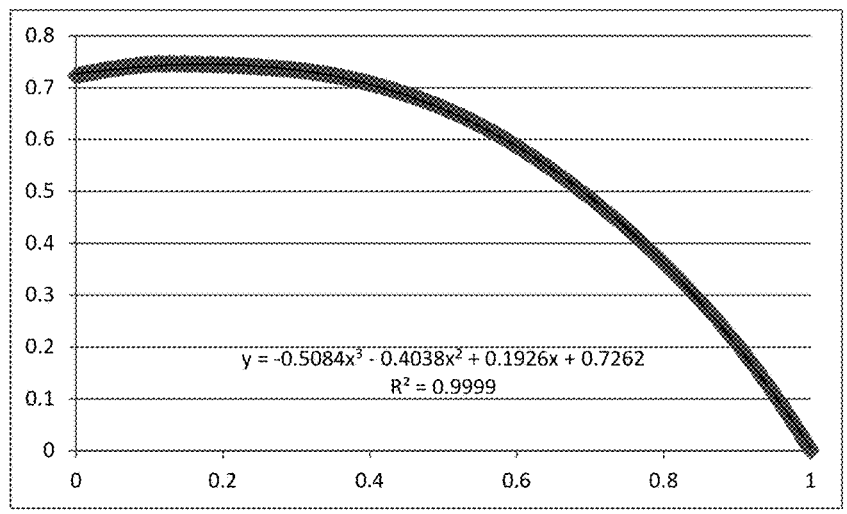
Figure 29C:
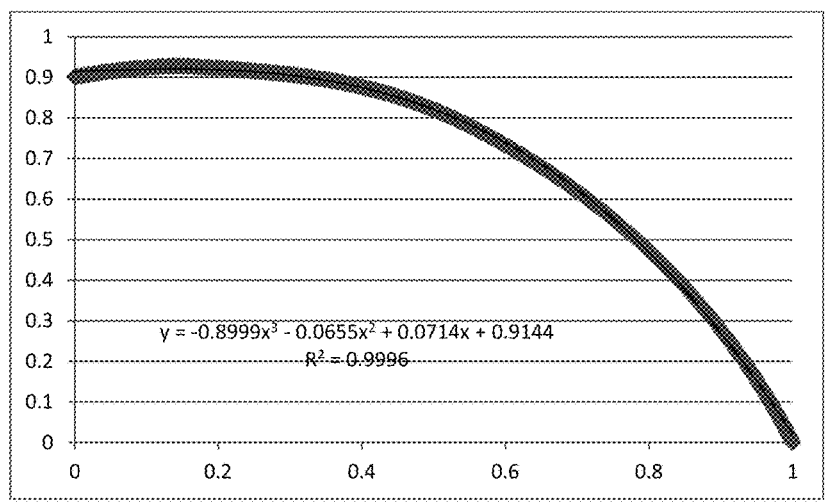
Figure 29C:
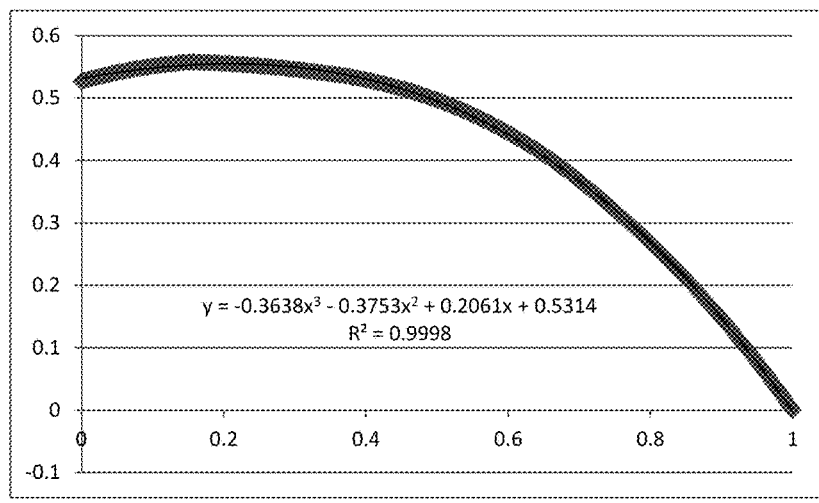
Figure 29C:
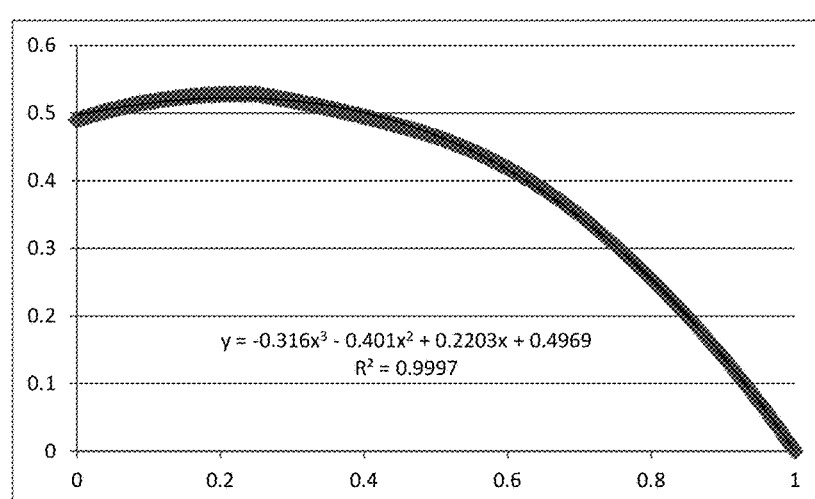
Figure 29D:
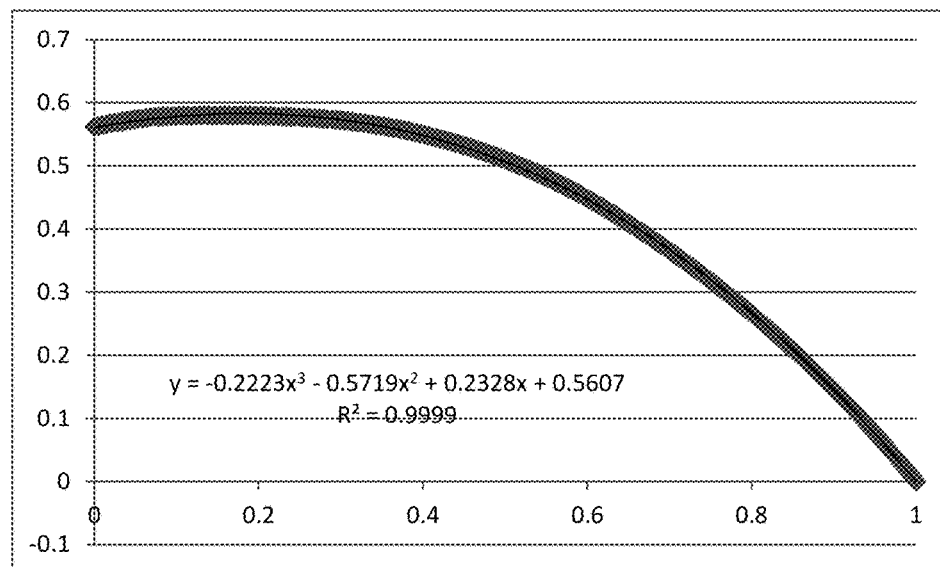
Figure 29D:
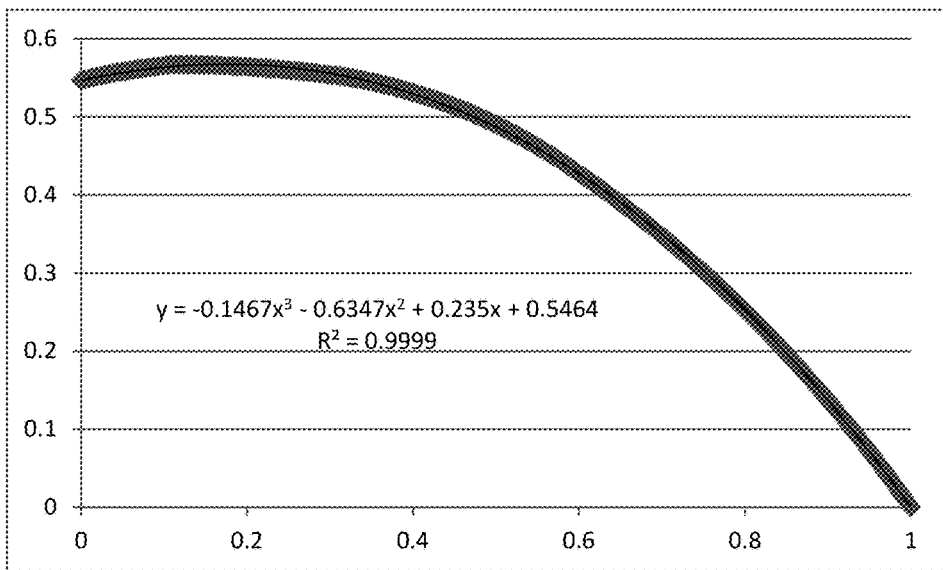

The optimum secondary reflector shape derived from the method described above depends on a number of collector geometrical parameters. Therefore, a sensitivity analysis was completed where various input variables to the method were varied, including the width of secondary aperture, the secondary height, the absorber size and the absorber height relative to the secondary aperture. The resultant proposed secondary reflector profile for each case is summarized in Table 4 below; e.g. the best fit parameters for the best-fitting third-order polynomial equations (see equation 12 above). FIGS. 29A through 29B shows the plots obtained for each secondary reflector profile for each test case listed in Table 4. Each of the secondary reflector profiles evaluated had a first half and a second half that was a symmetrical, mirror-image of the first half. As shown in the figures, only the first half of each profile was evaluated. In addition, as described above, the point corresponding to the where the first half and second half of the profile join was placed on the y-axis (x=0), and the outer most point, at one-half the width of the profile, was placed on the x-axis (y=0). Next, all of the data points describing the first half of the profile were normalized and converted to dimensionless numbers by dividing each value of x and y by the width of half of the profile. As a result, the width of the first half of the profile was set to 1.0, positioned at (W, 0), for each of the cases analyzed with the point where the two halves join positioned at (0, D). This procedure insures that a meaningful comparison can be made between differing shaped secondary reflector profiles, even if the dimensionalized shapes (e.g. measure in units of length; feet, meters, etc.) vary significantly due to, for example, different power plant scales.

TABLE 4

Sensitivity Test - Third-Order Polynomial Equation Parameters.

| # | case # | cusp? | a' | b' | c' | d | R2 | D | W |
|---|--------|-------|--------|--------|--------|--------|--------|--------|---|
| 1 | FIG. 7 | yes | −0.5889 | −0.4195 | 0.2260 | 0.7899 | 0.9998 | 0.7830 | 1 |
| 2 | FIG. 8 | no  | −0.7768 | −0.0758 | 0.0378 | 0.8191 | 0.9998 | 0.8210 | 1 |
| 3 | 30  | yes | −0.3551 | −0.3689 | 0.2223 | 0.5064 | 0.9997 | 0.5392 | 1 |
| 4 | 35  | yes | −0.3554 | −0.4034 | 0.2110 | 0.5460 | 0.9999 | 0.5684 | 1 |
| 5 | 40a | yes | −0.4507 | −0.3502 | 0.2143 | 0.5872 | 1.0000 | 0.6132 | 1 |
| 6 | 40b | yes | −0.2600 | −0.5967 | 0.2333 | 0.6257 | 1.0000 | 0.6471 | 1 |
| 7 | 40c | yes | −0.3222 | −0.4806 | 0.2279 | 0.5742 | 0.9999 | 0.5955 | 1 |
| 8 | 40d | yes | −0.5084 | −0.4038 | 0.1926 | 0.7262 | 0.9999 | 0.7449 | 1 |
| 9 | 40e | yes | −0.8999 | −0.0655 | 0.0714 | 0.9144 | 0.9996 | 0.9281 | 1 |
| 10 | 40f | yes | −0.3638 | −0.3753 | 0.2061 | 0.5314 | 0.9998 | 0.5575 | 1 |
| 11 | 40g | yes | −0.3160 | −0.4010 | 0.2203 | 0.4969 | 0.9997 | 0.5281 | 1 |
| 12 | 40h | yes | −0.2223 | −0.5719 | 0.2328 | 0.5607 | 0.9999 | 0.5798 | 1 |
| 13 | 40i | yes | −0.1467 | −0.6347 | 0.2350 | 0.5464 | 0.9999 | 0.5667 | 1 |
|   |     | min | −0.8999 | −0.6347 | 0.0378 | 0.4969 | 0.9996 | 0.5281 | 1 |
|   |     | avg | −0.4282 | −0.3959 | 0.1947 | 0.6327 | 0.9998 | 0.6517 | 1 |
|   |     | max | −0.1467 | −0.0655 | 0.2350 | 0.9144 | 1.0000 | 0.9281 | 1 |

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A device comprising:
   a reflecting surface for a concentrating solar system using a tracking system, the reflector surface having a length aligned along a first axis (z), wherein:
   a cross-section of the reflecting surface in a plane perpendicular to the first axis (z) forms a curve comprising a concave section positioned between a first endpoint and a second endpoint,
   at least a portion of the concave section is accurately approximated by a polynomial equation,
   the concave section is configured to focus a plurality of beams of light onto a focal point,
   the plane contains a second axis (x) that is perpendicular to the first axis (z) and a third axis (y) that is perpendicular to the second axis (x),
   the third axis (y) intersects the second axis (x) to form a dimensionless xy-coordinate system having an origin of (0, 0) at the intersection,
   the concave section is positioned in the dimensionless xy-coordinate system,
   the concave section comprises a first portion that starts at the first endpoint positioned at (1, 0) and terminates at an intermediate point at (0, D),
   D is a dimensionless number between 0.55 and 0.93, inclusively,
   the polynomial equation is a third-order polynomial equation defined as $$y = a'x^3 + b'x^2 + c'x + D$$

a' is between −0.15 and −0.09, inclusively,
   b' is between −0.45 and −0.07, inclusively,
   c' is between 0.10 and 0.24, inclusively, and
   a', b', and c' are all dimensionless numbers.

2. The device of claim 1, further comprising an aperture formed by a straight line connecting the first endpoint to the second endpoint, wherein the focal point is positioned at least partially within an area enclosed by the concave section and the straight line.

3. The device of claim 1, further comprising an aperture formed by a straight line connecting the first endpoint to the second endpoint, wherein the focal point is positioned outside an area enclosed by the concave section and the straight line.

4. The device of claim 1, wherein the first portion has a slope of 1.0 at the intermediate point.

5. The device of claim 1, wherein the first portion has a slope not equal to 1.0 at the intermediate point.

6. The device of claim 1, wherein the first portion is accurately described within the xy-coordinate system by the polynomial equation.

7. The device of claim 1, wherein
   b' is between −0.40 and −0.07, inclusively.

8. The device of claim 7, wherein c' is between 0.15 and 0.24, inclusively.

9. The device of claim 8, wherein D is between 0.60 and 0.93, inclusively.

10. The device of claim 1, wherein the first portion is accurately described as indicated by a regression $R^2$ value between 0.999 and 1.0 inclusively.

11. The device of claim 1, further comprising an absorber tube having a circular cross-section positioned at the focal point.

12. The device of claim 11, wherein the absorber tube is configured so that a heat-transfer fluid can flow through the absorber tube.

13. The device of claim 1, wherein:
the concave section further comprises a second portion that starts at the second endpoint positioned at (−1, 0) and terminates at the intermediate point, and
the second portion is a symmetrical, mirror-image of the first portion.

\* \* \* \* \*